(12) United States Patent
Kozlov et al.

(10) Patent No.: US 8,024,971 B2
(45) Date of Patent: Sep. 27, 2011

(54) CONVECTIVE ACCELEROMETER

(75) Inventors: Vladimir A. Kozlov, Jersey City, NJ (US); Vadim M. Agafonov, Jersey City, NJ (US)

(73) Assignee: Met Tech Inc., Jersey City, NJ (US)

( * ) Notice: Subject to any disclaimer, the term of this patent is extended or adjusted under 35 U.S.C. 154(b) by 0 days.

(21) Appl. No.: 12/421,954

(22) Filed: Apr. 10, 2009

(65) Prior Publication Data

US 2010/0116053 A1     May 13, 2010

Related U.S. Application Data

(63) Continuation of application No. 10/851,711, filed on May 21, 2004, now Pat. No. 7,516,660.

(51) Int. Cl.
     *G01P 15/125*     (2006.01)
(52) U.S. Cl. .................................................... 73/514.16
(58) Field of Classification Search .................. 438/379; 73/514.03, 514.09, 514.05, 504.03, 504.05; 29/25.03, 595
See application file for complete search history.

(56) References Cited

U.S. PATENT DOCUMENTS

| | | | |
|---|---|---|---|
| 3,209,600 A * | 10/1965 | Stiles et al. | 73/514.03 |
| 6,576,103 B2 * | 6/2003 | Abramovich et al. | 204/412 |
| 2003/0029719 A1 * | 2/2003 | Abramovich et al. | 204/252 |

* cited by examiner

*Primary Examiner* — Hezron Williams
*Assistant Examiner* — Tamiko D Bellamy
(74) *Attorney, Agent, or Firm* — Kenneth H. Sonnenfeld; Joseph D. Eng, Jr.; King & Spalding LLP

(57) ABSTRACT

A convective accelerometer capable of measuring linear or angular acceleration, velocity, or angle of inclination is provided. The accelerometer comprises sensing elements that are sensitive to convection located inside a sealed housing containing a liquid agent. Applied external acceleration causes forced convection of the liquid agent, which produces variations in an electric current produced by the sensing elements that are proportional to the applied acceleration or angle of inclination. The accelerometer has a small size, extremely wide frequency and dynamic ranges, high sensitivity, simple design and is suitable for mass production. The device has a wide range of application, such as stabilization and control systems, homeland security, and oil exploration.

10 Claims, 28 Drawing Sheets

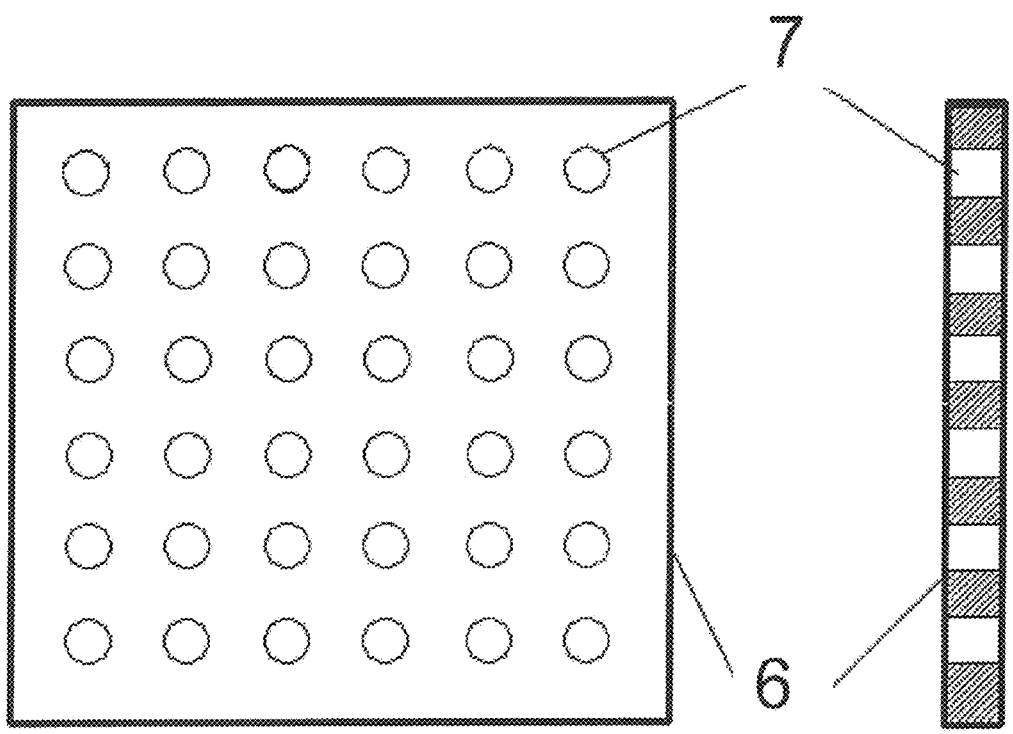

1. Electrolyte-filled toroid
2. MET cell;
3. Expansion bulb

If an angular acceleration is applied as shown by the rounded arrow, the fluid flows through the sensitive element. The output current of the transducer is proportional to angular acceleration or angular velocity in wide frequency band, depending on the sensitive element configuration

CONVECTIVE ACCELEROMETER

This application is a continuation of application Ser. No. 10/851,711 filed May 21, 2004, the contents of which are hereby incorporated by reference in their entirety.

FIELD OF THE INVENTION

The invention relates to MEMS accelerometers, and more specifically to fluid-containing transducer-based MEMS accelerometers which measure acceleration, inclination, position and velocity by measuring the change in the electric current generated by a liquid flow under the effect of external acceleration or free convection.

Accelerometers of different types have found wide application in many fields including transportation, navigation, robotics, consumer electronics, toys, and medical instruments, especially orthopedic devices.

BACKGROUND

Various mechanical and electromechanical instruments are currently used for measuring acceleration, inclination, velocity, and motion, including piezoelectric and piezoresistive instruments, and force balanced, capacitive or convective accelerometers.

In accelerometers having a force feedback or servo-accelerometers the inertial mass is spring-suspended between two permanent magnets and can move between these permanent magnets. The displacement of the mass due to external acceleration is measured by standard electrodynamic methods. A signal of a sensor is amplified and the resulting current passes through a coil wound on the mass, thereby producing a rebalancing force that restores the inertial mass to its original position. The accelerometers of this type have high sensitivity and accuracy; however, they also have a high cost.

Another type of accelerometer which is capable of measuring an angular velocity is based on the phenomenon of injection of gas into a chamber through a nozzle under the effect of external acceleration. The chamber has two sensing elements in the form of wires arranged so that the injected gas is uniformly distributed between the sensing elements in the absence of external acceleration. In the presence of an acceleration, the gas accumulates near one of the wires, which becomes colder than the other wire. The difference in the resistance of the two sensing elements is proportional to the angular velocity. A main disadvantage of such an accelerometer is the presence of a spraying nozzle, which makes the instrument bulky and expensive.

Another type of accelerometer is a convective accelerometer. An example of a prior convective accelerometer is one that contains a heating element installed at the center of a housing and two temperature sensing elements arranged in the housing symmetrically with respect to the heating element. In the absence of external acceleration, a heated gas circulates symmetrically with respect to the heating element and the temperature sensors are essentially at the same temperature so that the difference of their readings is close to zero, thereby indicating the quiescent state. In the presence of external acceleration this symmetry is broken, and the sensing elements are at different temperatures. The respective temperature difference is then proportional to the external acceleration. The disadvantages of such an instrument include a low dynamic range, low sensitivity, and high consumption of energy due to the presence of a heating element. Such an accelerometer is also incapable of measuring purely rotational motion.

Thus, there is an urgent need for highly sensitive accelerometers having a wide frequency and dynamic range, small size, low power consumption, low weight, and low cost.

SUMMARY OF THE INVENTION

The convective accelerometer according to this invention comprises a sealed housing containing an installation module that has a sensing element. The housing further comprises a liquid agent comprising an electrolyte. The sensing element comprises electrically conductive members, non-limiting examples of which include metal plates with holes and a metal mesh. Conductive members are spatially separated. Separation may be achieved by spacing the conductive members so that they are not in direct contact, or by physically separating them with a spacer material, such as a dielectric spacer with holes. When metal plates and dielectric spacers are used, the metal plates and dielectric spacers are arranged such that the liquid agent flows through the holes under conditions of forced convection caused by external acceleration. It should be noted that the combination of the housing, the liquid agent, and the sensing element (including conductive members and any spacers) is referred to herein as a molecular electronic transducer (MET). The signal-conditioning electronics connected to the MET via the sensing elements are used for conversion of an output electric current, which varies according to the convective transfer of ions to the sensing elements, thereby allowing the measurement of acceleration, velocity or inclination.

One object of the invention is to provide a convective accelerometer comprising a sealed housing comprising a liquid agent comprising an liquid electrolyte and at least one installation module secured in the housing. The convective accelerometer further has at least one sensing element that is sensitive to convection and that is fixed in the installation module and immersed in the liquid electrolyte that flows through the sensing elements under conditions of forced convection caused by an applied external acceleration. The convective accelerometer also has an electric circuit connected to the one or more sensing elements that amplifies and processes the output signals generated by this system.

Another object of the invention is to provide a convective accelerometer comprising a sealed housing containing a liquid agent comprising an electrolyte and at least one installation module secured in the housing. The installation module has one sensing element that is immersed in the liquid agent that flows through the accelerometer under conditions of forced convection caused by applied external acceleration. In some embodiments, the sensing element includes a number of punched metal plates having punched holes, as well as a number of spacers having punched holes, which are arranged to separate the metal plates. In preferred embodiments, the spacers are positioned without a gap between the metal plates and are made of a dielectric material. The convective accelerometer further comprises an electric circuit connected to the system of sensing elements that is used for amplifying and processing the output signals generated, by this system.

The invention also provides methods for measuring angular acceleration, angular velocity or inclination that include providing a toroidal housing containing a liquid agent and a least one sensing element having at least one pair of conductive members separated by punched dielectric partitions and arranged in the cross-section of the housing. The liquid agent inside the housing moves under the effect of angular acceleration, thus transferring and dragging along ions to the sensing elements, due to forced convection. In this case, the change of current against that in the absence of acceleration from each conductive member in the sensing element(s) is proportional to the magnitude of angular acceleration, angular velocity or inclination depending on the geometrical characteristics of the sensing elements and dielectric plates.

Another object of the invention is to provide a method of measuring angular acceleration and/or angle of inclination comprising (1) providing an installation module that is secured in a sealed housing having a toroidal channel; (2) fixing at least one sensing element that is sensitive to convection within the installation module; (3) adding to the sealed housing a liquid agent comprising an electrolyte; (4) connecting the one or more sensing elements to an electric circuit; (5) subjecting the housing to angular acceleration by rotating it about an axis of sensitivity of the accelerometer normal to the plane of the toroidal channel or by inclining it through an angle relative to the vector of gravity to produce forced convection of the liquid agent; and (6) determining the value of the angular acceleration or angle of inclination of the housing by measuring the change of the output current gathered from the one or more sensing elements, wherein the output current is generated in the electric circuit connected to the one or more sensing elements.

Another object of this invention is to provide a linear accelerometer comprising a sealed housing with a channel that is partially filled with a liquid agent containing an electrolyte solution. An installation module is secured in the sealed housing such that the installation module is submersed in the liquid agent. The installation module contains a sensing element that is sensitive to convection of the liquid agent, and is immersed in the liquid agent, such that the liquid agent flows through the sensing element under conditions of forced convection when a linear acceleration applied to the convective accelerometer. The linear accelerometer also provides an electric circuit connected to the sensing element, wherein said electric circuit amplifies and processes output signals generated by said sensing element.

One object of the present invention is to provide an accelerometer having an extremely high sensitivity.

Another object of the invention is to provide an accelerometer with a wide frequency range and dynamic range with a simultaneous decrease of the intrinsic noise level.

Yet another object of the invention is to provide a small convective accelerometer that can be mounted in very narrow places.

One object of the present invention is to provide a convective accelerometer with a simple design and low cost in volume production.

An object of the invention is to provide a method of measurement of angular acceleration, angular velocity or inclination that would allow measurement of these parameters with a high accuracy in a wide frequency and dynamic range.

BRIEF DESCRIPTION OF THE DRAWINGS

The convective accelerometer and a method of measurement of angular acceleration and angle of inclination with the accelerometer are further explained by way of example with reference to the accompanying drawings.

FIG. 5 is a schematic diagram of the arrangement of holes in one embodiment of a dielectric spacer or a metal plate.

FIG. 6 is a side view of the device of FIG. 5.

DETAILED DESCRIPTION OF THE INVENTION

Figure 1:
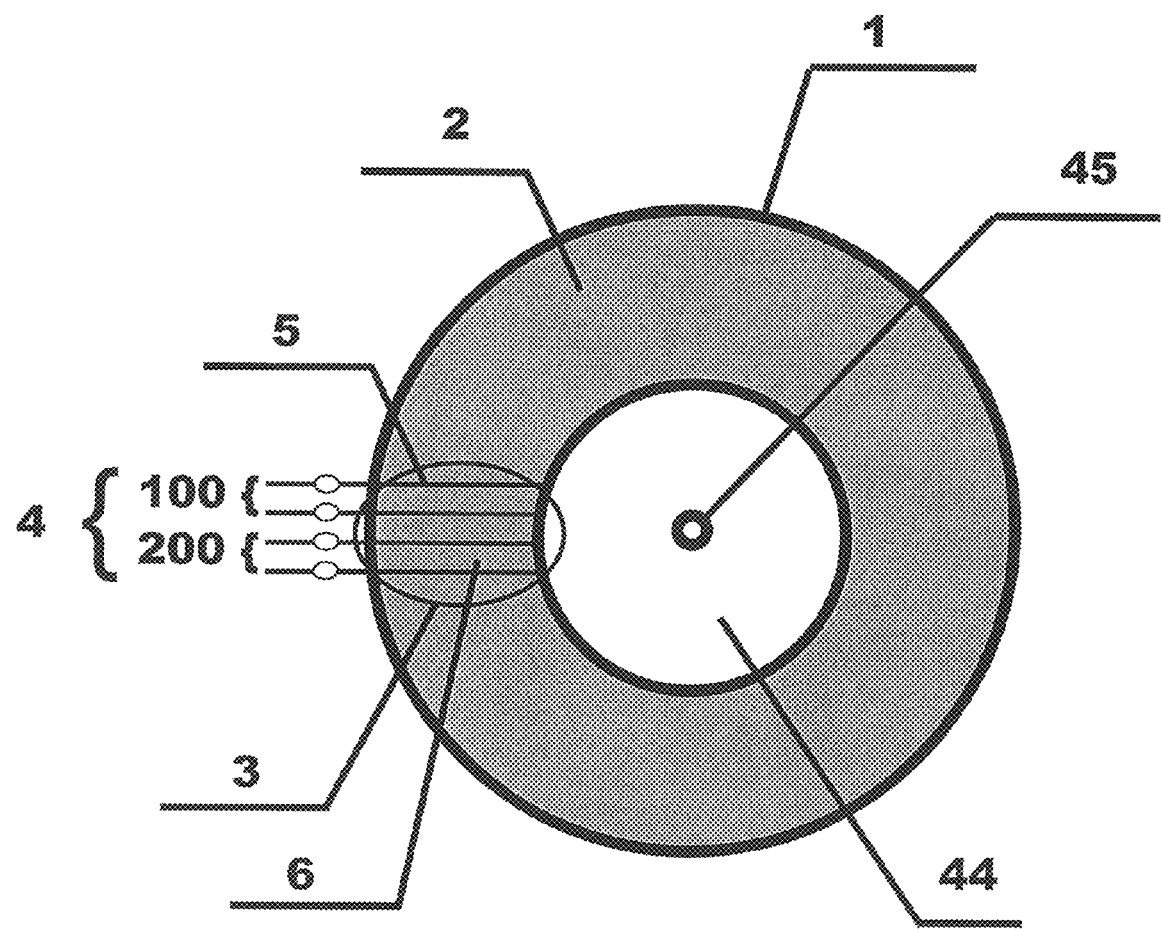
FIG. 1 is a schematic diagram of one embodiment of the convective accelerometer having a sensing element comprising four metal plates and three spacers.
Figure 2:
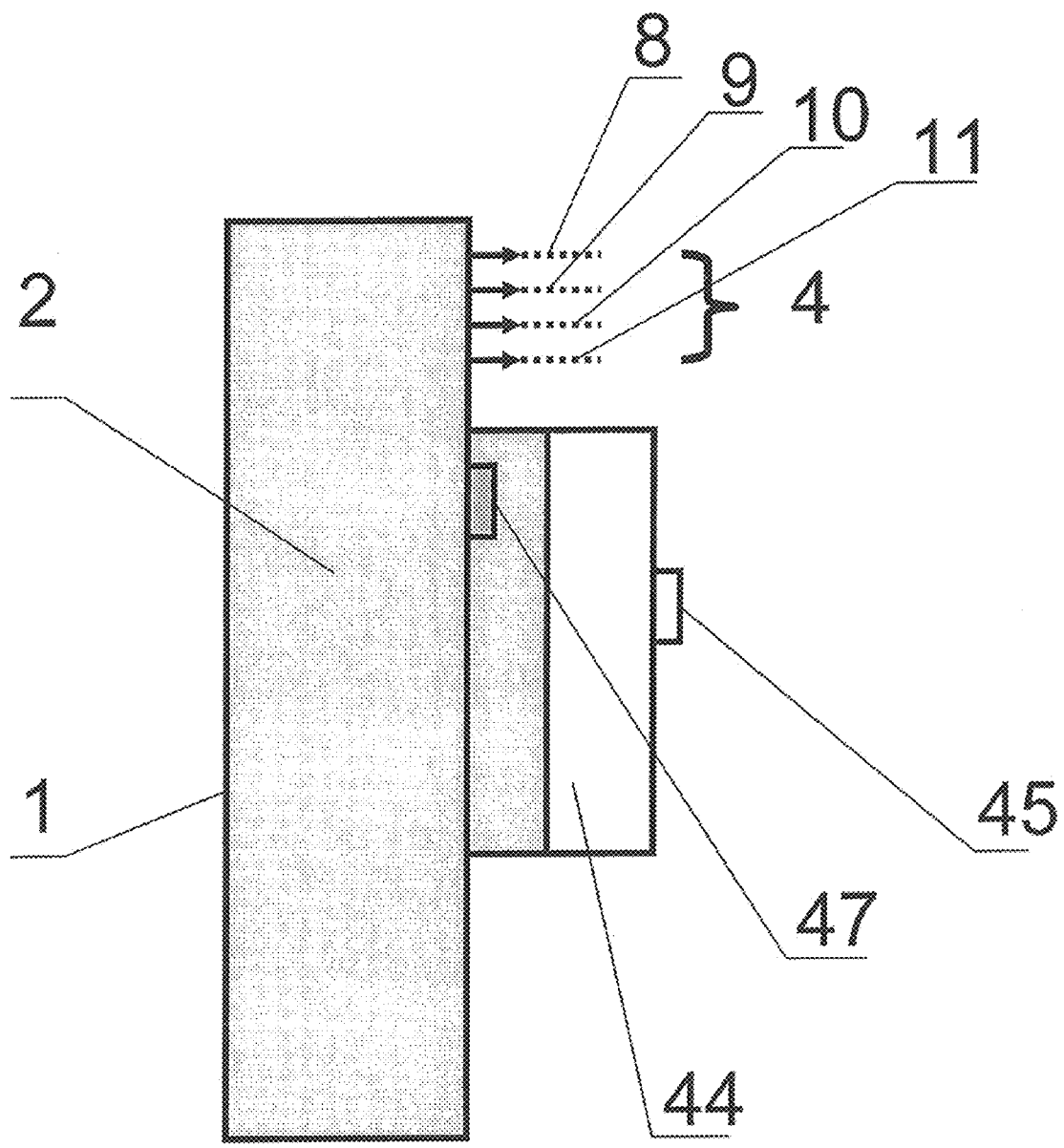
FIG. 2 is a side view of the device of FIG. 1.
Figure 3:
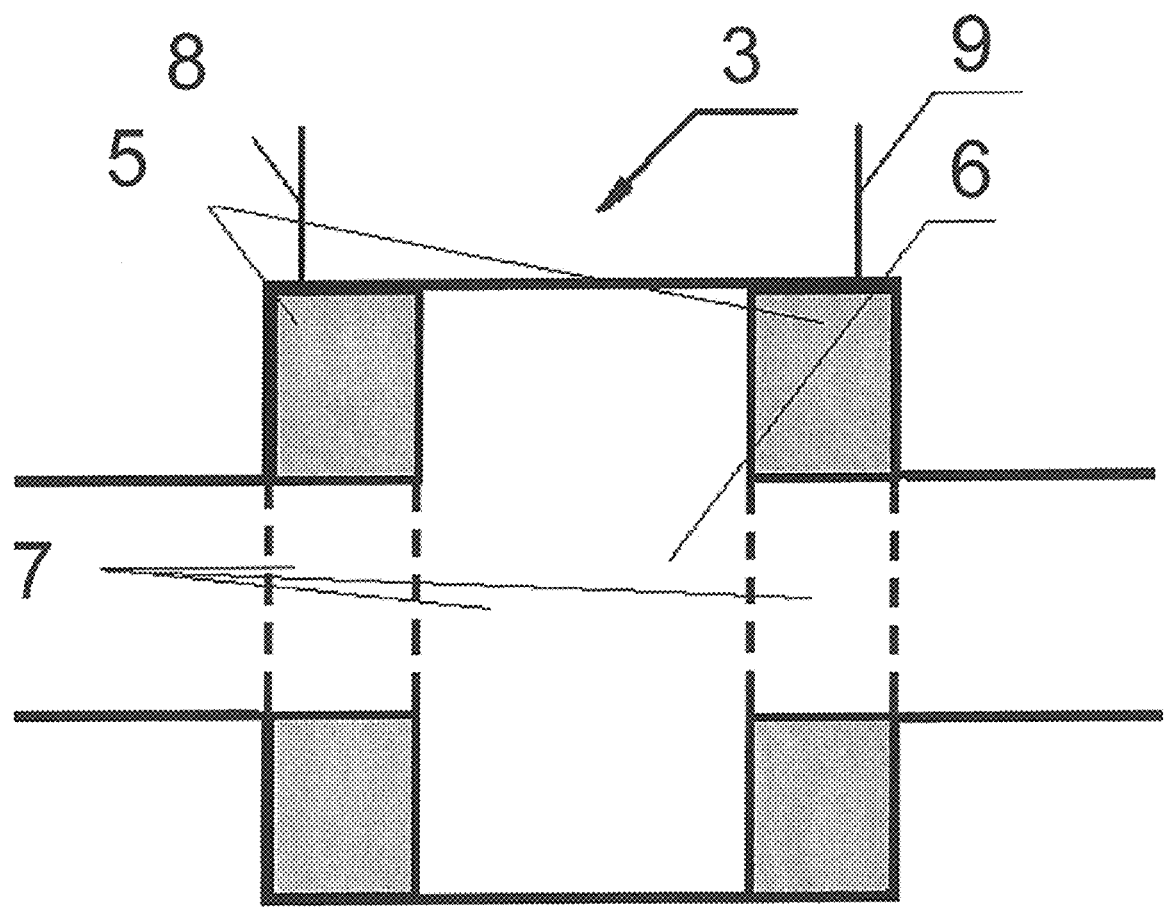
FIG. 3 is a schematic diagram of one embodiment of an installation module.

FIGS. 1 and 2 show an embodiment of a convective accelerometer according to this invention that comprises a sealed housing 1, a liquid agent 2 comprising an electrolyte contained in the sealed housing 1, and an installation module 3 (FIGS. 1, 3), in which sensing element 4 (FIG. 1) is rigidly secured.

Figure 4:
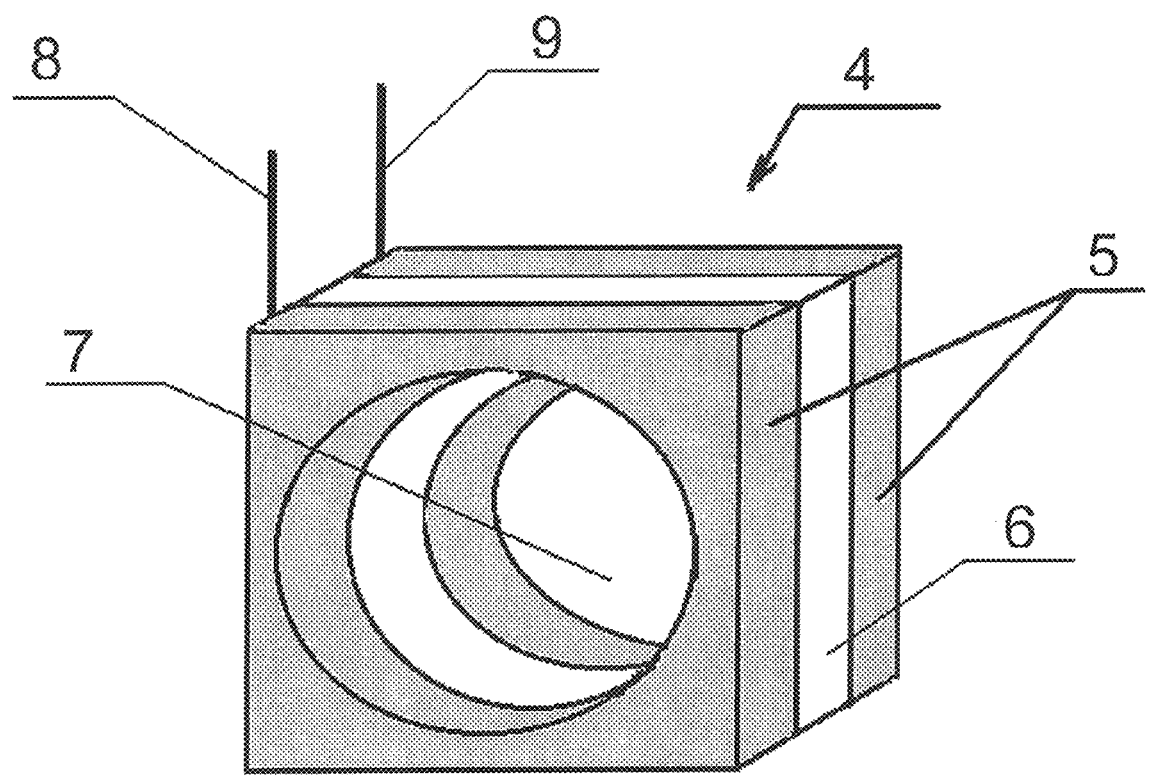
FIG. 4 is a schematic view of the system of sensing elements (in an axonometric view).
Figure 7:
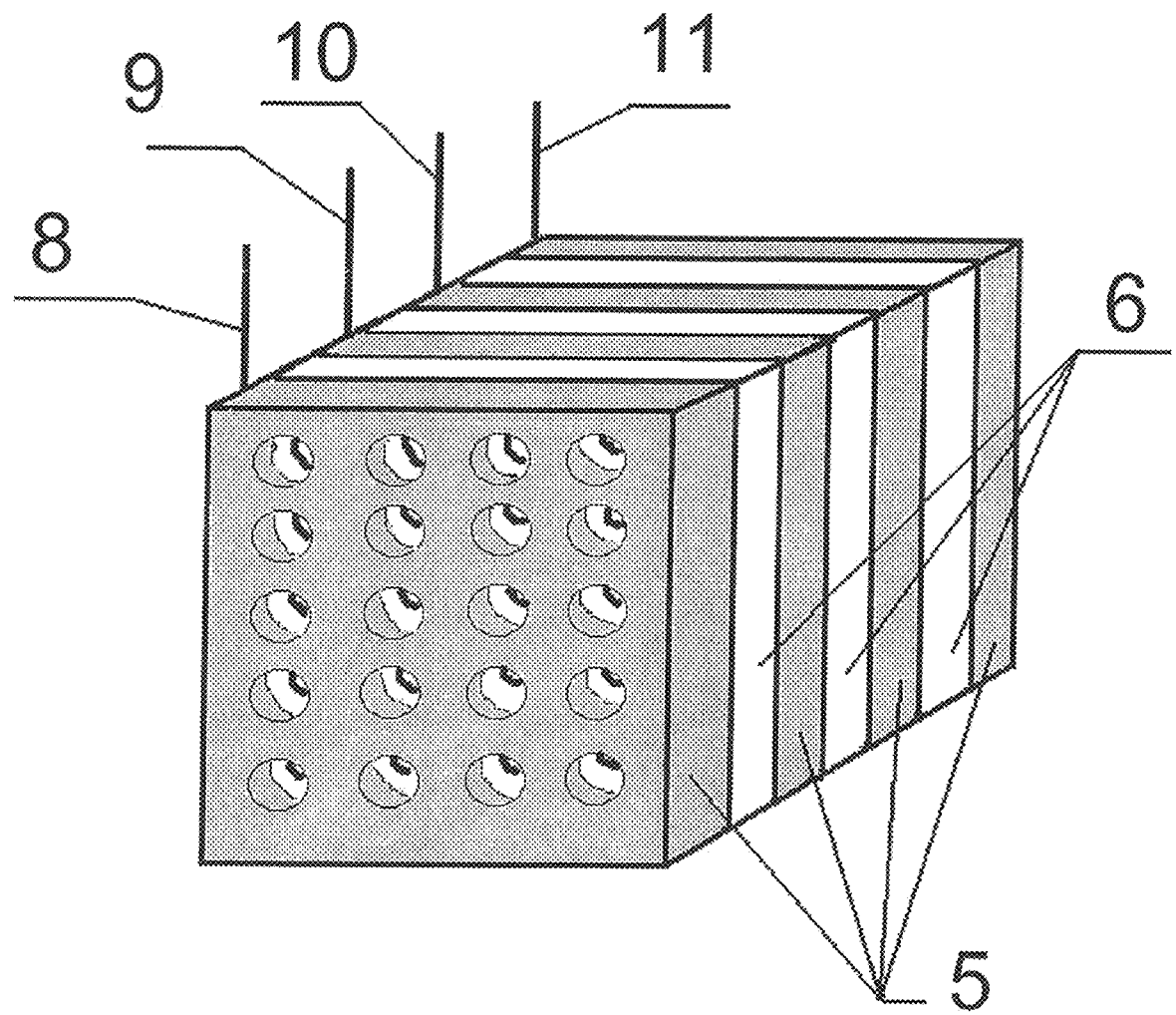
FIG. 7 is a schematic axonometric view of one embodiment of a sensing element having a plurality of metal plates with dielectric spacers arranged to separate them.

The accelerometer may contain one or more installation modules 3 (FIG. 3), each having (FIGS. 1, 4) a sensing element 4 that is sensitive to convection. The sensing element 4 (FIG. 1) may comprise conductive members 5, such as, for example, two pairs 100, 200 of metal plates separated by dielectric spacers 6. The metal plates and spacers are arranged in alternating layers and aligned so that the holes of the metal plates and the spacers coincide to allow flow of a liquid agent (e.g., one containing an electrolyte) through the holes, as shown in FIG. 4. Note that, for the sake of simplicity, FIG. 4 only shows two conductive members 5 (shown here as metal plates) and one spacer 6, which have only one hole 7 for a free flow of the liquid agent 2 through the sensing element 4 as a result of applied external acceleration. However, this invention contemplates sensing elements with metal plates and dielectric spacers that have a plurality of holes. For example, the conductive members 5 can be metal plates having output contacts 8, 9, 10, and 11 (see FIG. 2) and dielectric spacers 6 can be punched as shown in FIGS. 5, 6, and 7. In certain embodiments, the holes are the same size and shape and are arranged in a regular grid pattern. The dielectric spacers 6 are inserted between the conductive members 5 to prevent possible electric short circuits between them. However, in certain embodiments, the dielectric spacers are also used to cause laminar flow of liquid agent 2 through the sensing element 4. The thickness of the spacer 6 also affects the frequency range of the measurement, as set forth below. The diameter d and the number of holes 7 in the spacer 6, in turn, determine the accelerometer sensitivity and have an effect on the frequency dependence of the accelerometer transfer function in the full frequency operating range. With an increase of the number of holes 7 and an increase of their diameter d the hydrodynamic impedance of the spacer 6 decreases in inverse proportion to the number of holes 7 and the fourth power of their diameter d. Thus, by varying the number and diameter of the holes, the transfer function of the accelerometer can be varied. More specifically, the high cutoff frequency of the transfer function is proportional to the hydrodynamic impedance, such that the frequency range increases with increasing hydrodynamic impedance. With this in mind, a useful number of holes 7 is four or more for dielectric spacers 6 that are square, with a side dimension of 1.5×1.5 mm. Moreover, a useful range of hole diameter is between about 1 and about 300 microns, and preferably between about 20 to about 200 microns.

The material of the spacers 6 should be resistant to corrosion by the liquid agent 2, and should have a thermal expansion coefficient that is compatible with the other components of sensing element 4 so as to avoid damage as the result of temperature variations. Many different materials may be used, with suitable materials including, for example, oxides or fluorides of elements of the fourth group of the Periodic Table, forsterite, quartz, and glass. A useful range of spacer thickness is from about 0.5 to about 150 microns.

The shape of the holes 7 in metal plates 5 and dielectric spacers 6 is not particularly limited, and may be in any shape. Geometrical shapes such as, for example, squares, rectangles, circles and/or ovals are used in some embodiments. However, because, the intensity of the electric current passing through the conductive members of sensing element 4 is directly proportional to the area of the conductive member in contact with the liquid agent 2, in a particularly preferred embodiment, the holes 7 are circular apertures with "rays" extending radially (i.e., "star-shaped"). Various types of holes may be made in the conductive members and dielectric spacers by physical or chemical methods, non-limiting examples of which include stamping, laser drilling, chemical etching, and electrochemical methods.

It should be noted that the sensing element 4 may comprise a number of conductive members 5 in the form of metal plates and a set of dielectric spacers 6 located between these metal plates 5 as shown in FIG. 7.

The number of installation modules 3 and the corresponding sensing elements 4 chosen for a particular accelerometer depends on the required dynamic range of accelerations to be measured, the required degree of linearity, the frequency range, and the level of intrinsic noise. Generally, increasing the number of installation modules and sensing elements leads to increased dynamic range, linearity, frequency range, and decreased intrinsic noise. When the conductive members are in the form of metal plates, it is useful to install from four to eight such plates and three to seven spacers made of a dielectric material. Preferably, the plates and spacers are installed substantially parallel to each other, and substantially perpendicular to the local flow direction of the liquid agent 2.

The distance between conductive members 5 affects the frequency dependence of the transfer function of the claimed accelerometer: generally, the wider the required frequency range of measurement of accelerations, the closer to each other the conductive members should be installed.

Figure 8:
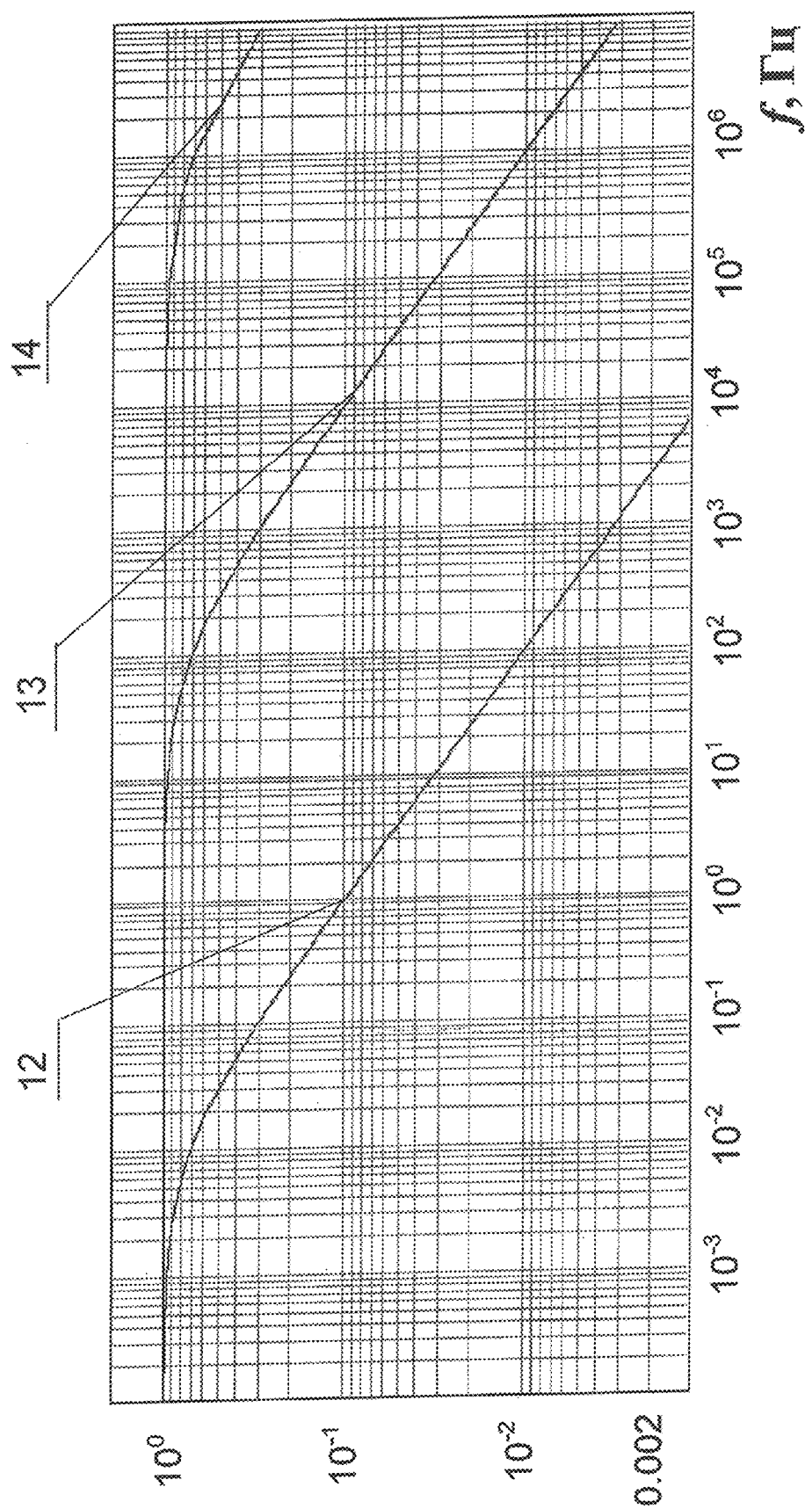
FIG. 8 is a schematic diagram of the gain-frequency characteristic of the transfer function of the accelerometer at different values of the thickness of the dielectric spacer.

FIG. 8 illustrates data for the amplitude-frequency characteristics of the accelerometer when distances between conductive members are varied. The curves 12, 13, and 14 correspond to a distance between the conductive members equal to 100, 40 and 10 microns respectively. FIG. 8 shows that it is possible to vary the transfer functions of the accelerometer for different practical applications by varying the distance between the conductive members. For an accelerometer which has an upper cut-off of the frequency range between several kHz up to tens of kHz (e.g., about 1 kHz to about 20 kHz), the distance between the conductive members is preferably from about 1 to about 10 microns. Accordingly, when dielectric spacers are used to separate the conductive members, the dielectric spacers should preferably be about 1 to about 10 microns thick for this frequency range.

Figure 9:
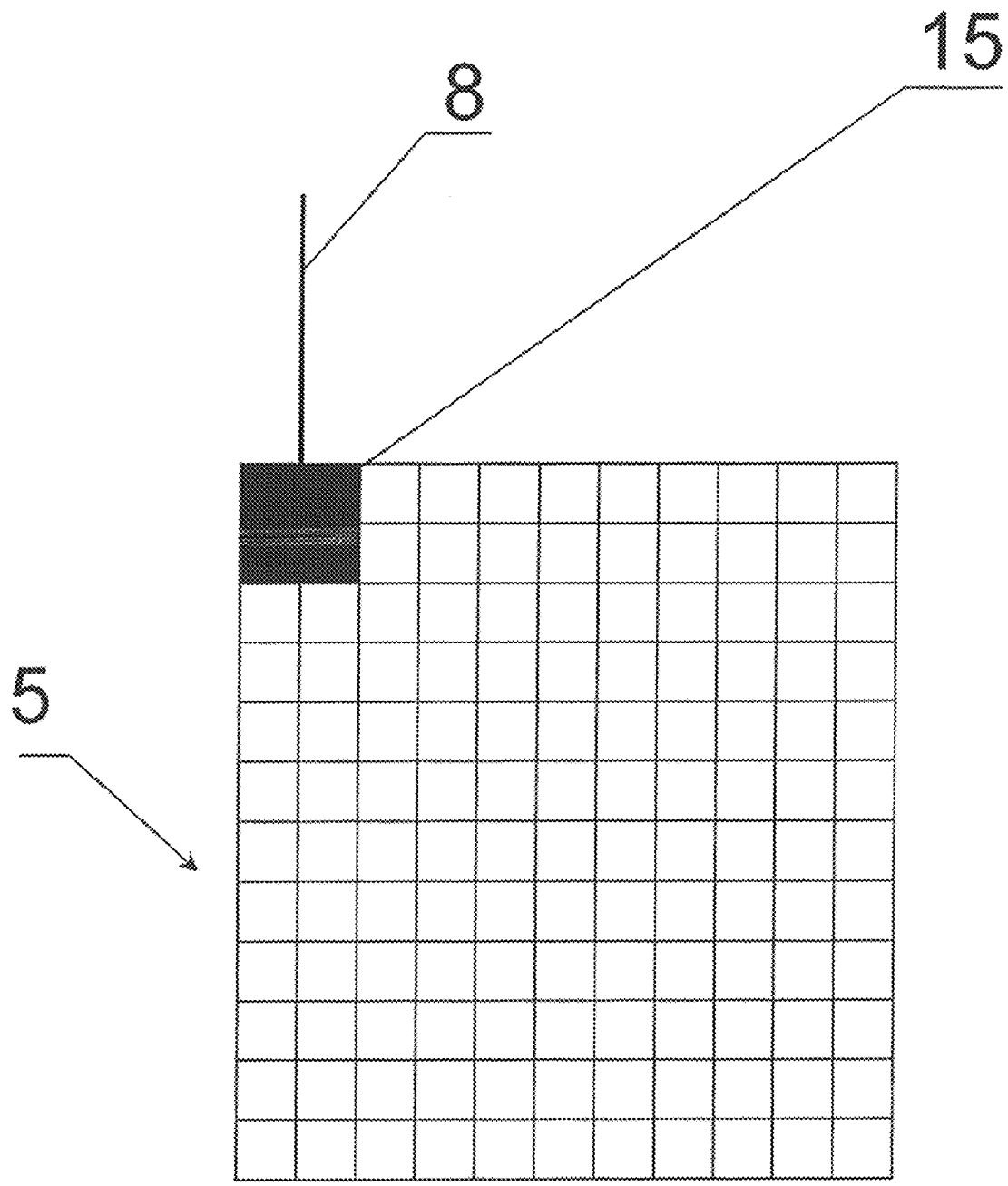
FIG. 9 is a schematic diagram of an embodiment of a conductive member, wherein the conductive member is a mesh.

The conductive members 5 for some embodiments of the claimed accelerometer can be made as a mesh comprising a plurality of wires, as shown in FIG. 9. To provide a high strength mesh, the mesh can be made as a twill weave, and the output contacts can be connected to the mesh via lamellas 15 by electrically welding the flat output wire to the mesh. For example, when the conductive element 5 is a mesh with a square shape and a side dimension of 1.5 mm, the thickness of the mesh is in the range of about 50 to about 90 microns, and the mesh may comprise a wire with a diameter from about 25 to about 45 microns. Generally speaking, wires having a diameter of about 10 to about 90 microns are useful for constructing a mesh for the convective accelerometer of this invention. Metals of the platinum group (Group 10) are suitable materials for manufacture of the mesh. However, other noble metals and their alloys, or other corrosion-resistant conductors can also be used for manufacture of the conductive elements. The mesh may be fabricated by electrically welding wires together, preferably such that the space between parallel wires is about 20 to about 90 microns.

The output contacts 8, 9, 10, and 11 can be made, for example, from a wire with a diameter of about 20 to about 100 microns. In preferred embodiments, the output contacts have similar thermal expansion coefficients as that of the wire mesh and the material that is used to make the installation module 3 and sealed housing 1.

The following provides a description of preferred ways to optimize and to operate the convective accelerometer.

The performance of the convective accelerometer according to the invention includes three primary characteristics: noise level, dynamic range, and frequency range. These primary characteristics may be adjusted by varying certain physical attributes (e.g., hole size, spacer thickness) of the convective accelerometer, as described below. It should be noted that, in some cases, varying a certain physical attribute improves one of the primary characteristics, but degrades another. Nevertheless, one of ordinary skill in the art would recognize that, by routine experimentation, it is possible to arrive at a given performance requirement by appropriately adjusting the different physical attributes of the convective accelerometer of this invention.

For example, to reduce the noise level, the hydrodynamic impedance should be decreased and the size of the sensing element and the contact area of conductive members with liquid agent should be increased. The hydrodynamic impedance may be decreased by increasing the number of holes and/or their diameters in the spacers and conductive members; increasing the space between parallel wires when a mesh-type conductive member is used; and/or decreasing the spacer thickness, the conductive member thickness, or both. The contact area of the conductive members with the liquid agent may be increased using thick conductive members with large holes; increasing the number of holes; selecting wires with a larger diameter and/or using rolled wires when a mesh-type conductive member is used; and/or selecting a hole shape that has a large perimeter (e.g., a star-shape).

While the noise level of the convective accelerometer reduces by decreasing hydrodynamic impedance, the dynamic range and linearity increase with increasing hydrodynamic impedance. The hydrodynamic impedance may be increased by installing mouthpieces as described herein; and/ or selecting internal and external generating shapes that increase the hydrodynamic impedance, as described herein.

The frequency range of the convective accelerometer can be increased by decreasing the thickness of the spacers, and/or using smaller-diameter holes, in addition to the methods described in the previous paragraph.

As an example, when a convective accelerometer with one installation module and no mouthpieces has a toroidal channel with a diameter of 9 mm, and a sensing element with conductive members having a thickness of 30 μm, spacers with a thickness of 30 μm, and corresponding holes with a diameter of 200 μm μm, the convective accelerometer has the following performance characteristics: frequency range 0-1000 Hz, noise level −85 dB, relative to 1 $rad/sec^2/\sqrt{Hz}$, and dynamic range 138 dBs relative to the noise in the passband 1 Hz at 1 Hz.

Figure 10:
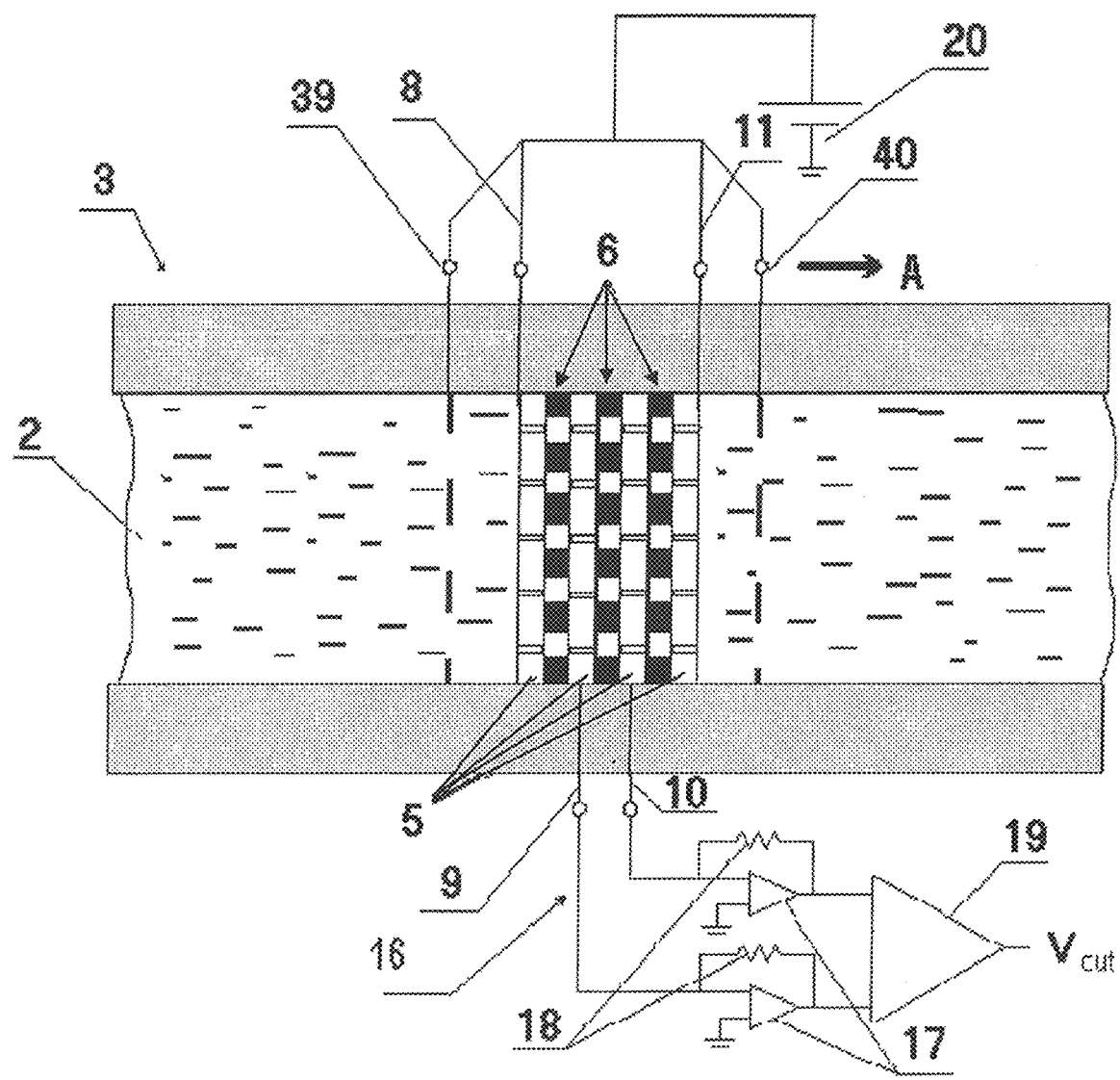
FIG. 10 is a schematic front sectional view of one embodiment of the accelerometer, wherein the accelerometer comprises guard electrodes.

In the case, for example, of an angular acceleration applied to the sealed housing 1 along the arrow A (see FIG. 10), the liquid agent 2 starts flowing through the conductive members 5, which are sensitive to convection. In so doing, electric charges existing as ions of dissolved salts and iodine (e.g., from the dissolution of metallic iodine) are brought to one of the conductive members 5 and are withdrawn from a neighboring conductive member, thereby generating in sensing element 4 an electric current whose value is proportional to the applied acceleration. For further amplification and processing of the electrical signals gathered from these conductive members 5, the conductive members 5 are connected (FIG. 2) to an electrical circuit 16 by means of terminals 8, 9, 10, and 11 (FIG. 2). This circuit is schematically shown in FIG. 10.

Figure 11:
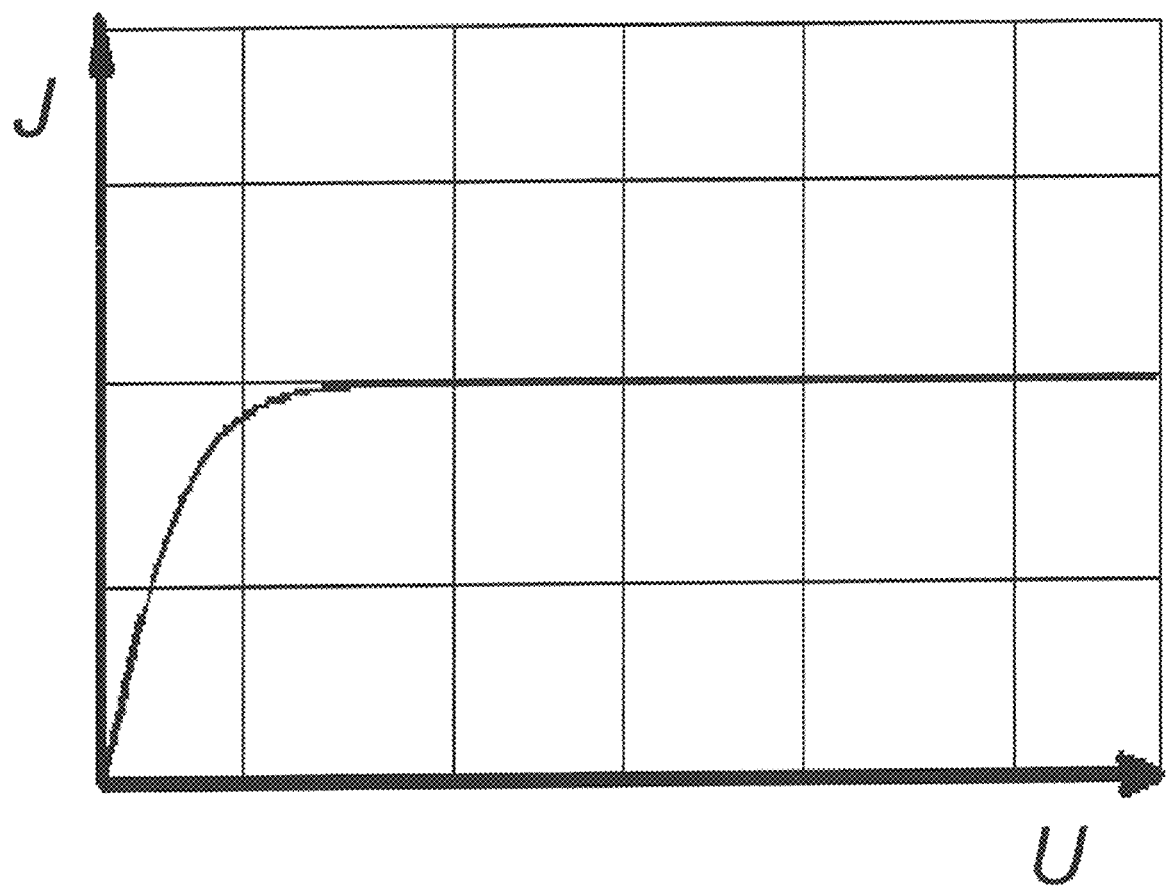
FIG. 11 is schematic view of the dependence of the output current from one pair of conductive members on the voltage difference applied thereon.

The electrical circuit comprises an operational amplifier 17 used for transforming the electric current gathered from the conductive member 5 into a voltage. In so doing, the resistance 18 in the feedback circuit of the operational amplifier 17 determines the total amplification factor of the output signal gathered from conductive members 5. The electric circuit also includes an adder 19, which is used for differential connection of two pairs 100, 200 of conductive members 5. In this case, the differential current from the two pairs 100, 200 of the conductive members is directly proportional to the magnitude of angular acceleration, angular velocity or inclination depending on the geometrical characteristics of the conductive members 5 and dielectric spacers 6. The power supply 20 is used as a power supply for all electrical circuits. The connection of the power source 20 is as follows: the positive terminal of the source 20 is connected to the output contacts 8 and 11 of the conductive member 5 and the negative terminal of the source 20 and the output contacts 9, 10 of the conductive member 5 are connected to the inputs of the operational amplifiers 17. In the absence of an external acceleration causing convection of the liquid agent 2 between the conductive members which are connected to the positive and negative terminals of the power source 20, a direct current $J_A$ passes through the circuit. The value of this current depends on the value of the applied voltage U as shown in FIG. 11. In this state, the space between the conductive members 5 connected to the negative terminal of the power source 20 practically has no charge carriers. When the accelerometer experiences an external acceleration in a direction indicated by the arrow A in FIG. 10, the liquid agent 2 carries an additional charge to a first conductive member 5 and carries a charge away from a second conductive member. Correspondingly, the current gathered from the first conductive member 5 increases and that gathered from the second one decreases. Since the current gathered from both conductive members 5 is practically independent of the resistance 18 in the feedback circuit of the operational amplifier 17, small variations of the current caused by the motion of the liquid agent 2 result in appearance of a high voltage across the resistance 18. Thus, in sensing element 4 the signal is amplified and, depending on the value of the resistance 18, the amplification factor can be as high as $10^7$. Accordingly, the convective accelerometer has an extremely high sensitivity with only a small inertial mass in the form of liquid agent 2.

An alternative way to connect the conductive members to an electronic circuit involves connecting the positive terminal of the power source and output contacts 8 and 11 of the conductive member 5 to the inputs of the operational amplifiers 17, and connecting output contacts 9 and 10 of the conductive member 5 directly to the negative terminal of the power source. However, the electronic noise in this case is higher at high frequencies.

Yet another way to connect the conductive members to an electronic circuit is to connect the positive terminal of the power source and output contacts 8 and 11 of the conductive member 5 to the inputs of a pair of operational amplifiers, and the negative terminal of the power source and output contacts 9 and 10 of the conductive member 5 to the inputs of another pair of operational amplifiers. The adder would have four inputs to connect to the outputs of each operational amplifier, so that output of the adder is a linear combination of voltages, gathered from each operational amplifier. In this case, the electronic noise is higher at high frequencies and lower at very low frequencies.

Figure 12:
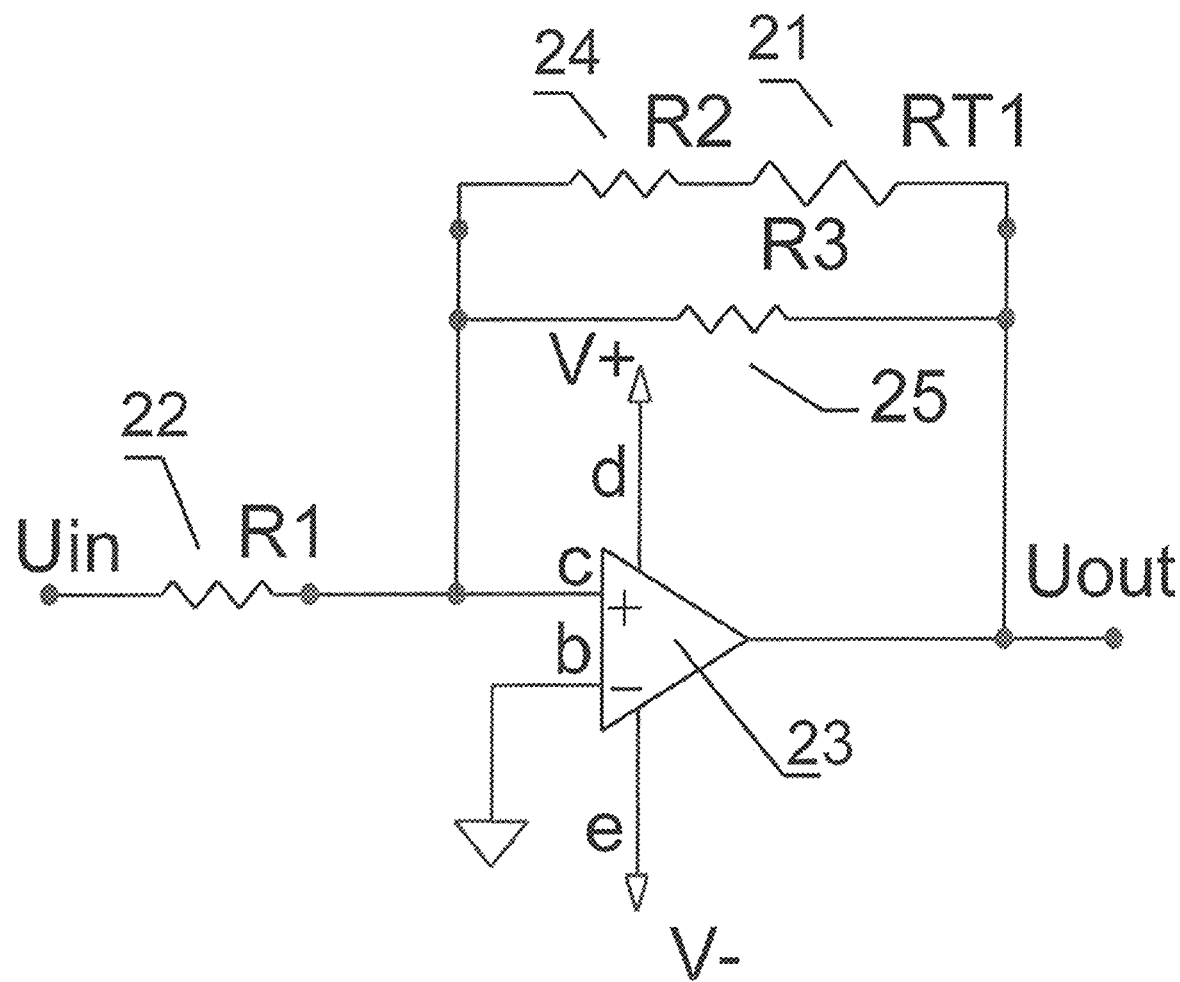
FIG. 12 is a schematic diagram of an electric circuit for temperature correction of the accelerometer output voltage.

Correcting electronics can also be used for improving the temperature stability of the accelerometer by compensating for the output voltage fluctuation due to changes of the ambient temperature, thereby compensating for changing frequency characteristics, as set forth below. Variations in the ambient temperature may affect the output signal of the accelerometer by changing the viscosity of liquid agent 2. Well-known methods of electronic compensation of the temperature dependence can be used in the present invention. In one embodiment, a semiconductor thermistor 21 (FIG. 12) whose temperature coefficient coincides with the temperature viscosity coefficient of the liquid agent 2 is used to compensate for temperature variations.

The signal from the output of the adder 19 (not shown in FIG. 12) is fed through a resistor 22 to the input of an operational amplifier 23 whose feedback circuit includes a thermistor 21 with adjusting resistors 24, 25. When the operational amplifier 23 is inserted in the circuit shown in FIG. 12, where b, c are the inputs of the operational amplifier 23, and d, e are used for connection to the power source 20 (not shown in FIG. 12), its amplification factor varies with a change of the temperature so as to provide a constant frequency characteristic of the accelerometer, despite changes in the ambient temperature. The electronic circuitry for frequency compensation of the transfer function of the accelerometer also can be used to extend the effective frequency range of the accelerometer, depending on the desired application. For example, the frequency range of an accelerometer with dielectric spacers 6 having a thickness of 25-40 microns can be extended to a frequency range of an accelerometer having a spacer 6.5 to 8 microns thick by using the frequency correction circuit.

Figure 13:
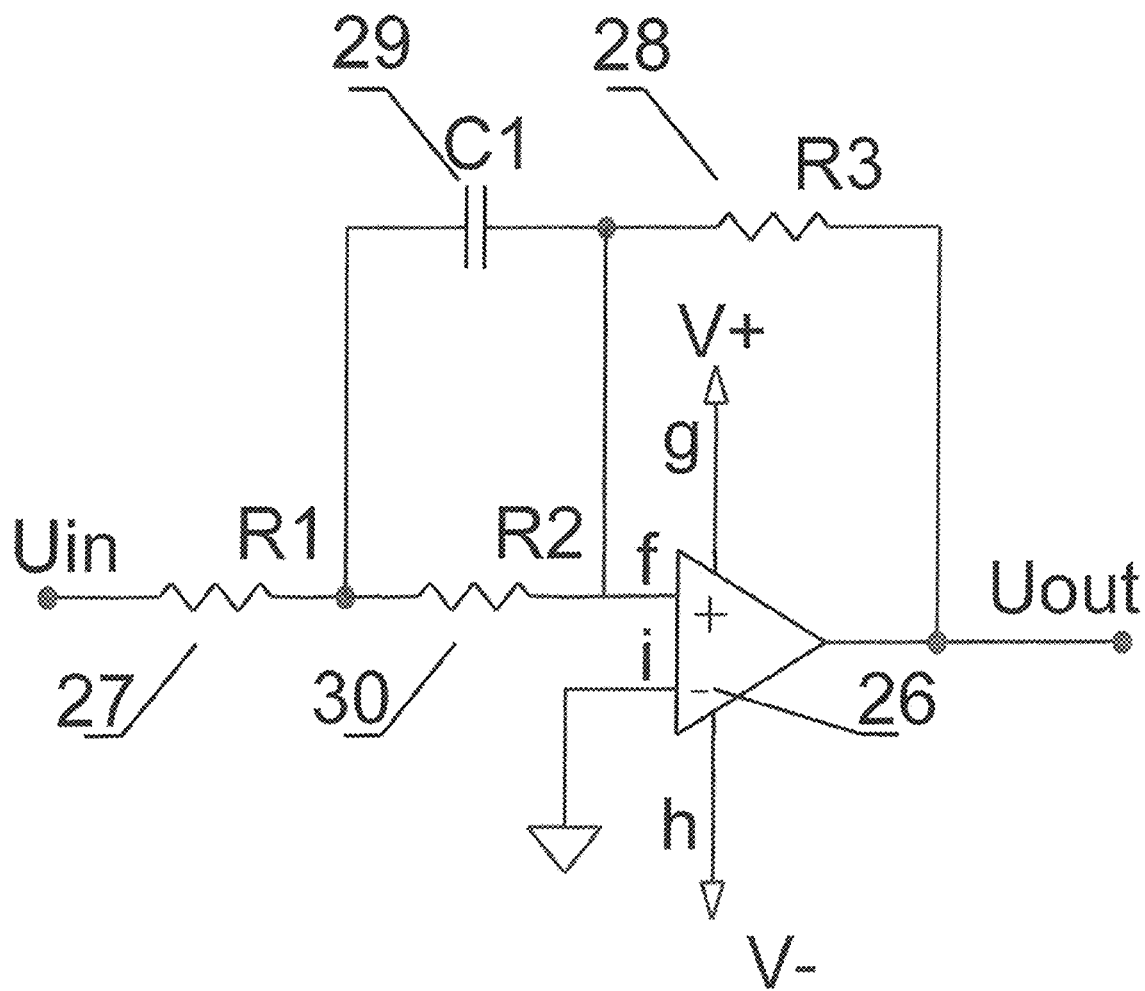
FIG. 13 is a schematic diagram of an electric circuit for frequency correction of the accelerometer output voltage.

An example of a frequency correction circuit is given in FIG. 13.

The output signal from the accelerometer $V_{out}$ is applied to the input of the frequency correction circuit to produce an extended passband at the output. The frequency correction circuit comprises an operational amplifier 26 connected as shown in the figure. The output voltage of the adder 19 (not shown in FIG. 13) is applied to the input f of the operational amplifier 26 through a resistor 27. The input g is grounded, and h and i are used for connection of the power source 20 (not shown in FIG. 13). The resistor 28 sets the sensitivity of the accelerometer, while the correcting circuit $R_2C_1$ consisting of a capacitor 29 and a resistor 30 together with the resistor 27 limits the amplification of high frequencies and are used for forming the required passband of the accelerometer.

The sensitivity of the accelerometer also depends on the physical and chemical properties of the liquid agent 2 contained in the housing 1. In preferred embodiments, it is desirable that the liquid agent 2 has a minimum viscosity at maximum solubility. Further, the liquid agent may comprise a salt (e.g., a salt of an alkali metal or an alkaline earth metal) and a solute capable of acting as both a Lewis acid and a Lewis base, such as dissolved metallic iodine. Suitable solvents for this purpose include, for example, distilled water and organic solvents capable of dissolving organic or inorganic salts, preferably metal salts, such as alkali salts. When dissolving the salts of alkali metals, the density of the solution increases, resulting in an increase of the sensitivity of the accelerometer. Therefore, in certain embodiments, it is desirable that the concentration of the dissolved salts is high, preferably, close to the solubility limit. Generally speaking, a useful concentration range for the dissolved salt is about 0.5 to about 4.0 mol/liter, and preferably about 2 to about 4 mol/liter. Also, the purities of the salt and the solute that acts as a Lewis acid/base (e.g., iodine) should be at least 98.5%, but most preferably at least 99.98%. The electric current output of the accelerometer is determined by the concentration of the dissolved metallic iodine, the ions of which are carriers of charge that are capable to receive an electron from and to give back an electron to the conductive members 5. Thus, it is useful to have a saturated solution of the above salts and minimum concentration of 0.0002 N of dissolved metallic iodine. Such a concentration of the dissolved salts provides operation of the instrument in a wide range of negative temperatures, e.g., down to −70° C. The metallic iodine concentration may be lower, but in this case the current output of the claimed accelerometer may be insufficient for normal operation of the electric circuits, including the circuits used for temperature and frequency correction. A useful concentration range for the dissolved metallic iodine is about 0.0002 to about 0.4 mol/liter, and preferably from about 2 to about 4 mol/liter. The dissolved salts may comprise salts of metals of Group II of the periodic table which have a solubility in the fluid that is not lower than that of salts of alkali metals. The most suitable for this purpose are, for example, salts of barium, which, at maximum solubility, have solution densities that exceed the corresponding solution density of salts of alkali metals by 1.5 times, for a given molar concentration of salt solute.

Figure 14:
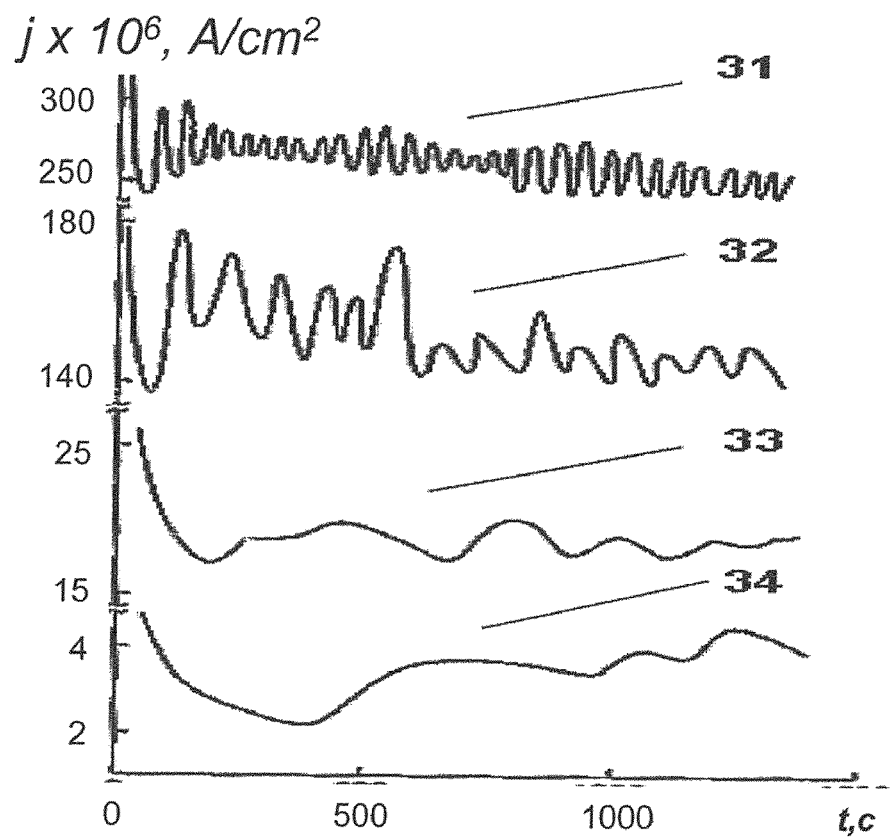
FIG. 14 shows the dependence of the output current of the accelerometer in the absence of external acceleration on different concentration of salts of alkali metals.
Figure 15:
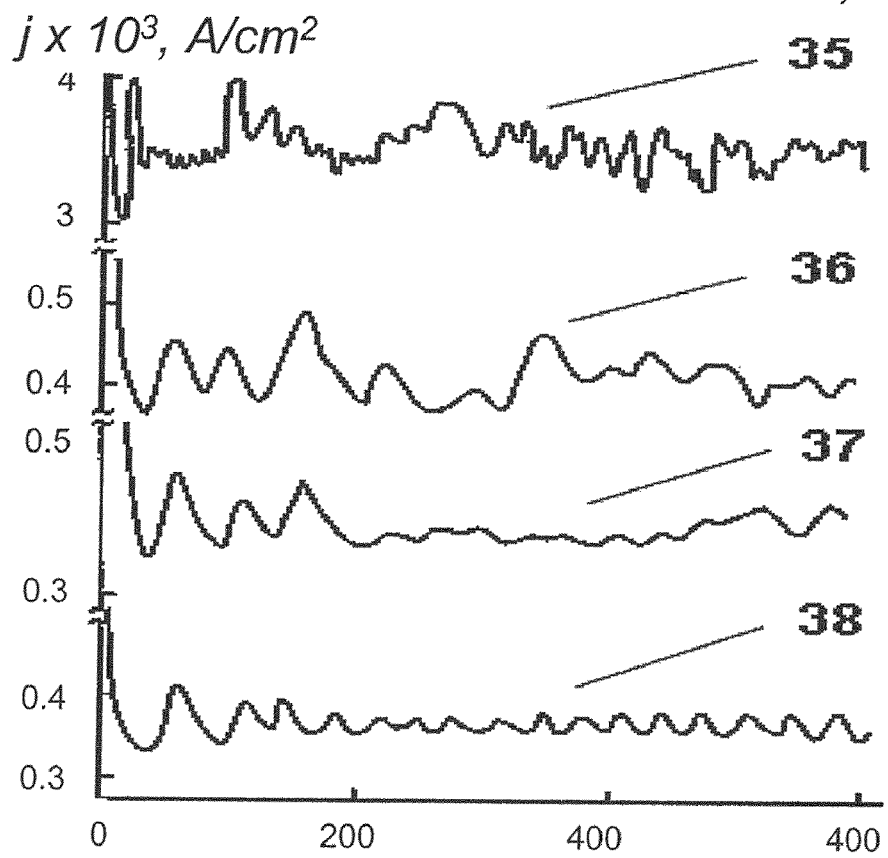
FIG. 15 shows the dependence of the output current of the accelerometer in the absence of external acceleration on different concentrations of iodine.

In addition to the sensitivity, an important characteristic of the accelerometer is the level of its intrinsic noise. The ions of iodine which act as charge carriers are influenced by gravity and may accumulate near the bottom part of the sensing elements 5 when the accelerometer is mounted. As a consequence, a local change of the solution density takes place, thus causing free convection. The presence of free convection inside the sealed housing 1 results in fluctuation and even in self-oscillation of the electric current at the output of the accelerometer in the absence of external acceleration. A strict balance of the content of salt and metallic iodine allows oscillations to be avoided and minimizes the effect of noise of free convection. FIGS. 14 and 15 present data for different concentrations of the dissolved salts and metallic iodine, where the observation time is applied on the abscissa and the value of the output current of the claimed accelerometer in the absence of external acceleration is applied on the ordinate.

In FIG. 14, the output current is plotted as a function of different KI concentrations, at a constant iodine concentration of 0.0002 mol/liter. Curves 31-34 correspond to KI concentrations of 4, 3, 2, and 0.2 mol/liter, respectively. A comparison of the data given in FIG. 14 shows that at a fixed concentration of iodine, the amplitude of the output current due to free convection is acceptable at alkali metal salt concentration of 2 mol/liter, which practically does not vary even as the alkali metal salt concentration is decreased.

In FIG. 15 curves 35-38 correspond to the concentration of dissolved metallic iodine of 0.8 mol/liter, 0.5 mol/liter, 0.1 mol/liter and 0.02 mol/liter, respectively. For these studies, the metallic iodine was dissolved in a 2 M KI solution. A comparison of the data shows that at a fixed alkali metal salt concentration, the amplitude of the output current due to free convection is a minimum at an iodine concentration of 0.02 mol/liter. The output current drops monotonically as the iodine concentration is decreased further.

The convective accelerometer described herein also operates as an inclinometer based on the same principles that are described above, except that the role of the external acceleration is replaced by the angle of inclination of an axis of sensitivity of the accelerometer to the vector of gravity. It should be noted that the axis of sensitivity depends on the type of accelerometer involved. For example, for rotational accelerometers having a toroidal channel filled with a liquid agent, as described herein (see e.g., FIG. 1) the axis of sensitivity is perpendicular to the plane defined by the toroidal channel. On the other hand, the axis of sensitivity of a linear accelerometer having a toroidal channel partially filled with a liquid agent, as described herein (see e.g., FIG. 24.) has an axis of sensitivity in the plane defined by the toroidal channel. In any event, when the claimed accelerometer is inclined, the liquid agent 2 starts moving, and the adder 19 produces a voltage proportional to the angle of inclination.

The following description provides some exemplary embodiments of this invention.

Figure 16:
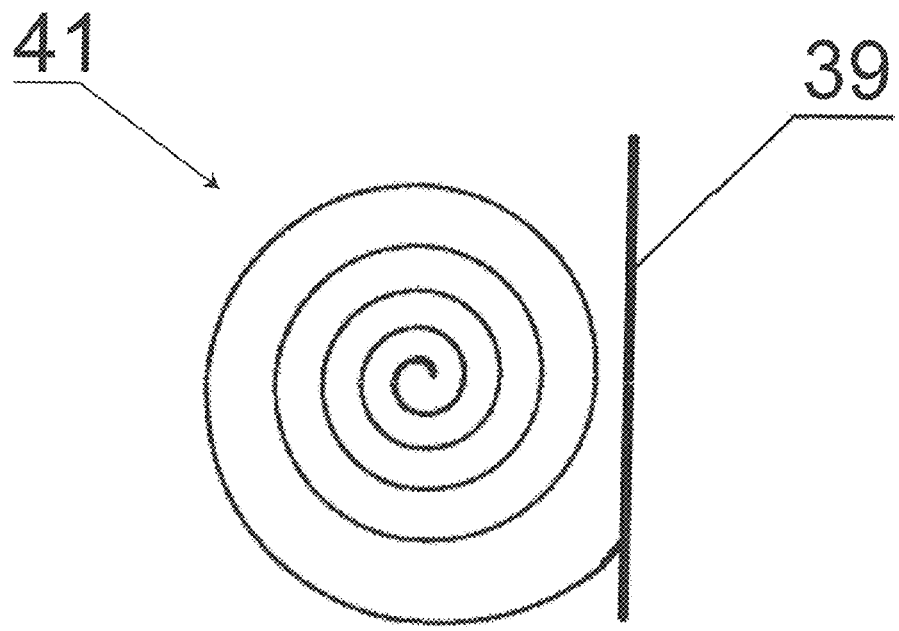
FIG. 16 is a schematic diagram of one embodiment of a guard electrode, wherein the electrode is made as a spiral-shaped ring.
Figure 17:
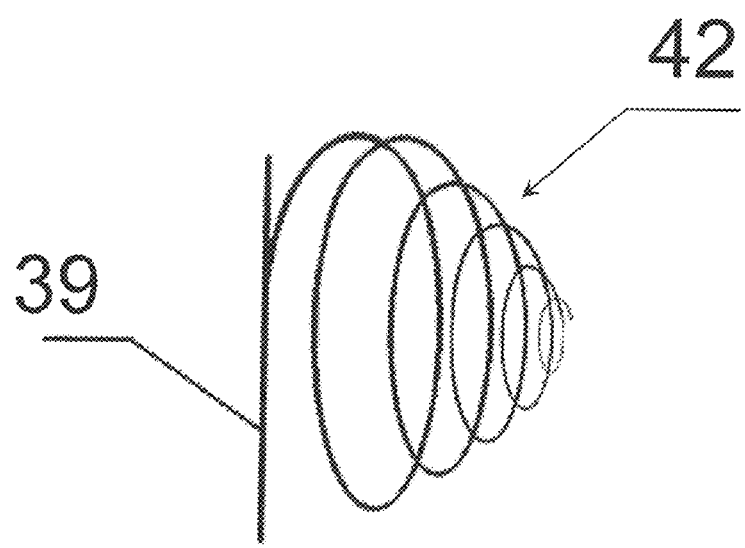
FIG. 17 is a schematic diagram of one embodiment of a guard electrode, wherein the electrode is made as a cone-shaped spiral.
Figure 18:
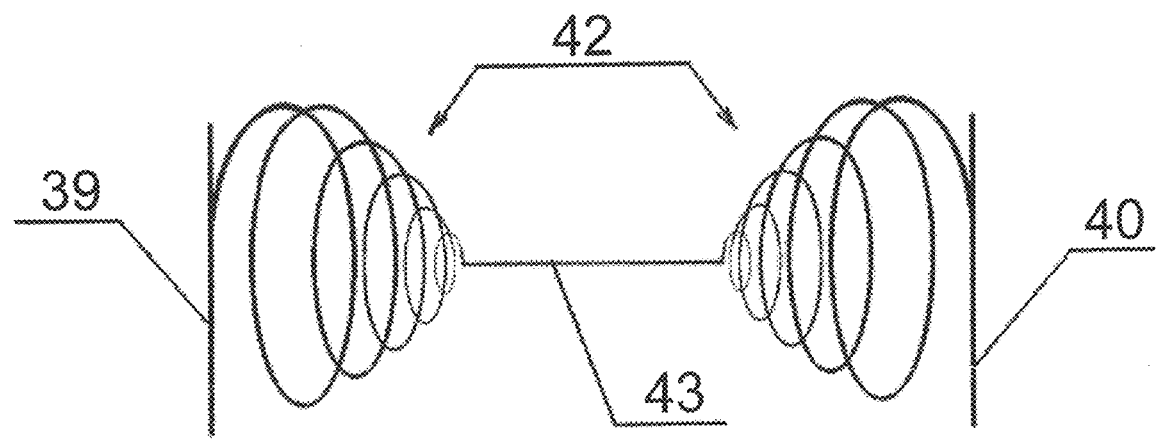
FIG. 18 shows one embodiment of the invention wherein the guard electrodes are connected by a wire.

In one embodiment, two additional electrodes 39, 40 may be installed at a fixed distance from the conductive members 5 as shown in FIG. 10. Generally, the guard electrodes should be as close as possible to the outermost conductive members of the sensing elements, and may even touch in some embodiments. In other embodiments the outermost conductive members of the sensing elements are separated from the guard electrodes by about 5 to about 120 microns. The presence of additional guard electrodes 39, 40, results in spatial nonuniformity of the concentration of the charge carriers beyond the conductive members 5, thereby reducing free convection due to the difference of densities of the liquid agent in the bulk volume and near the surface of the conductive members 5. For this application, the shape of the additional guard electrodes 39, 40 is not particularly limited, and generally may be any shape that (1) provides a large contact area with the liquid agent 2 (i.e., a contact area that is equal or greater than the area of contact between a conductive member and the liquid agent and (2) has a minimal contribution to the hydrodynamic impedance (i.e., at least a factor of two less than the hydrodynamic impedance of the sensing element). For example, the guard electrode may be in the shape of a ring spiral 41, (FIG. 16), a cone-shaped spiral 42 (FIG. 17), or as a flat mesh as shown in FIG. 9. To provide high operational stability, the guard electrodes 39, 40 are preferably interconnected by a conductive element 43 as shown in FIG. 18. The guard electrodes 39, 40 (FIG. 10) are connected to the positive terminal of the power source 20 in preferred embodiments. Furthermore, when more than one installation module is used as described more fully below, it is preferable to provide corresponding guard electrodes for each installation module.

The sealed housing 1 (FIG. 1) is used to house the liquid agent 2 and to prevent any leakage or evaporation of the liquid agent 2. Many types of materials or combinations of materials may be used to fabricate sealed housing 1, provided that the materials or combination of materials present a chemically stable and non-conductive surface to the liquid agent 2. For example, the sealed housing 1 can be made according to standard ceramic technology using diffusion welding, and also can be made of quartz, glass or a chemically stable plastic material. The output contacts 8, 9, 10, and 11 are sealed terminals and are used for connecting the conductive members 5 with an electrical circuit. In certain embodiments, an upper tank 44, which is made integral with the sealed housing 1, is provided, which serves as an expansion volume to compensate for the thermal expansion of the liquid agent 2 in a wide range of fluctuation of the environmental temperature. Liquid agent 2 is admitted into sealed housing 1 through an inlet 45.

Figure 19:
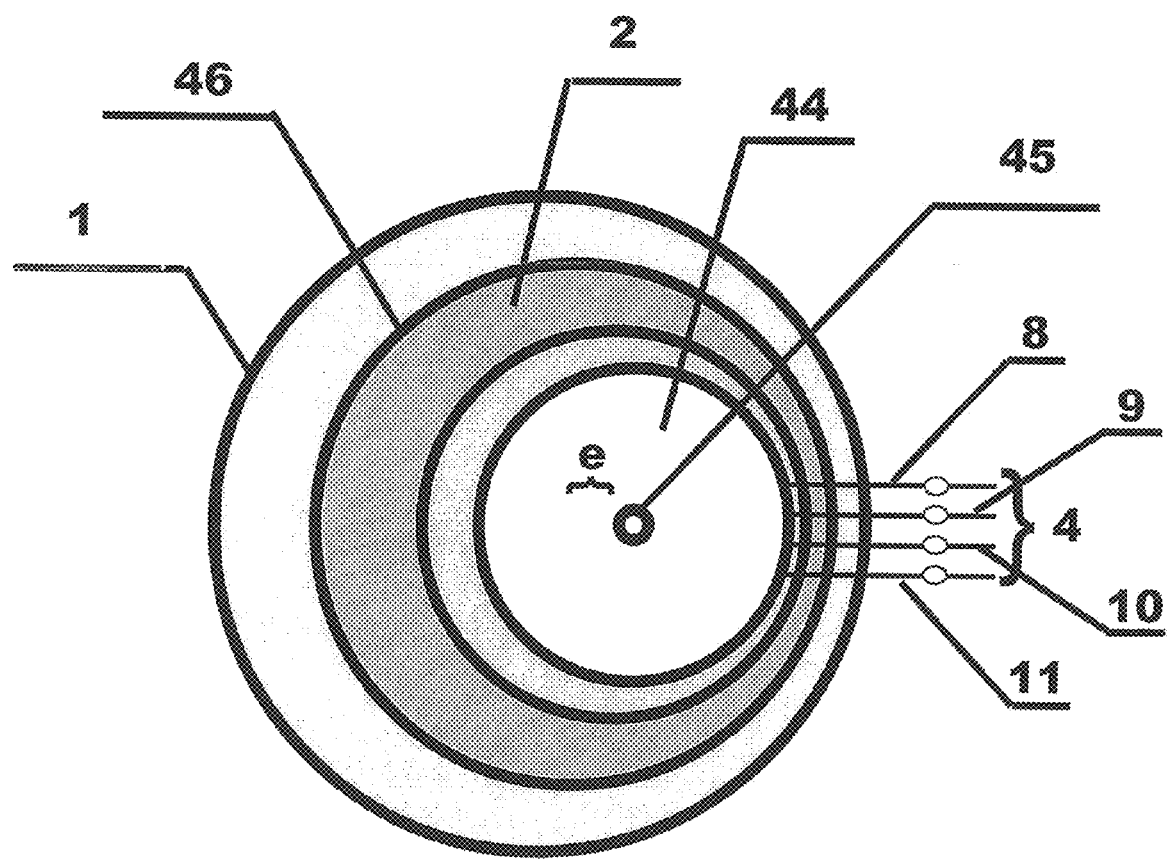
FIG. 19 is a schematic diagram of a sealed housing comprising a toroidal channel, wherein the toroidal channel is made in such a way that external and internal generating shapes are eccentric, with the degree of separation of their centers denoted as e.

The sealed housing 1 (FIG. 19) may be provided with a channel 46 also filled with liquid agent 2. The shape of the channel 46 is defined by external and internal generating shapes, which may be the same type of shape or different. The type of generating shape is not particularly limited and may be any closed shape (e.g., ellipses, circles, rectangles, squares, ovals, or even irregular shapes). For example, when the internal and external generating shapes are circular, and the cross-section of the channel is circular, the channel comprises a toroidal duct. It should be noted that this invention also contemplates non-toroidal ducts, including those which may have the same or different internal and external generating shapes, and/or ducts that do not have a circular cross-section. However, a toroidal duct is advantageous for minimizing the effect of possible housing deformations due to temperature and pressure variations in the external environment, which can cause variations in the accelerometer response. Accordingly, an accelerometer with a toroidal duct has increased sensitivity to motions of the liquid agent 2 that originate due to forced convection under the effect of external acceleration even in the presence of environmental interferences. The channel 46 contains a liquid agent 2 that is typically admitted through a capillary 47 (FIG. 2), which provides a free flow of the liquid agent 2 from the upper tank 44 into the toroidal channel 46 (FIG. 19). The toroidal channel 46 can be made in such a way that the internal and external generating shapes are eccentric with respect to each other. The degree to which the internal and external generating shapes are eccentric is denoted e, which represents the distance between the centers of the internal and external generating shapes. For certain preferred applications, e can vary between about 0.1 to about 5 mm. For high frequency applications, it is useful to have a convective accelerometer with a large value of e (i.e., $\geq 1$ mm, see FIG. 19), because the cut-off frequency of the accelerometer increases with increasing value of e.

Figure 20:
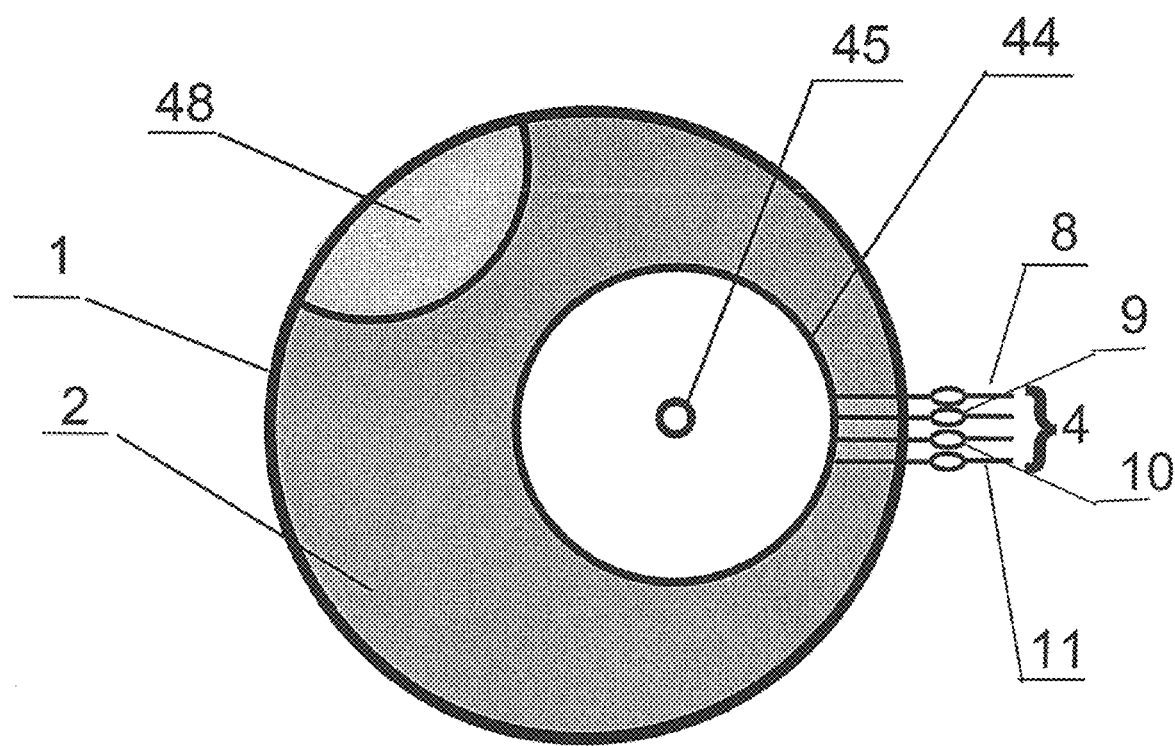
FIG. 20 is a schematic diagram of a toroidal channel with a mouthpiece installed therein.

Additionally, in some embodiments the frequency range of the convective accelerometer may be varied by varying the value of the hydrodynamic impedance to the motion of the liquid agent 2 through the use of a "mouthpiece." Here, a "mouthpiece" is defined as an object that is added to the sealed housing to increase the hydrodynamic impedance of the channel 46. For example, a mouthpiece may be installed on one of the walls of the channel 46 (FIG. 20). The presence of this component results in local constriction of the channel 46, thereby increasing the hydrodynamic impedance. The number of mouthpieces 48 may vary and is determined by first determining the hydrodynamic impedance required for a particular frequency range, and then determining the number of mouthpieces that are required to attain that hydrodynamic impedance. As one of ordinary skill in the art would understand, these parameters can be determined from routine experimentation. As an alternative to using mouthpieces, local constrictions in the channel 46 may be achieved by choosing inner and outer generating shapes that provide the requisite constriction of the channel to attain the desired hydrodynamic impedance. For example, if a toroidal convective accelerometer with circle of diameter d as the internal generating shape were modified so that the internal generating shape is a square of side dimension d, the hydrodynamic impedance of the modified accelerometer would be greater than that of the original accelerometer. This is because the channel would be locally constricted at the corners of the square, which would extend into the channel.

Figure 21:
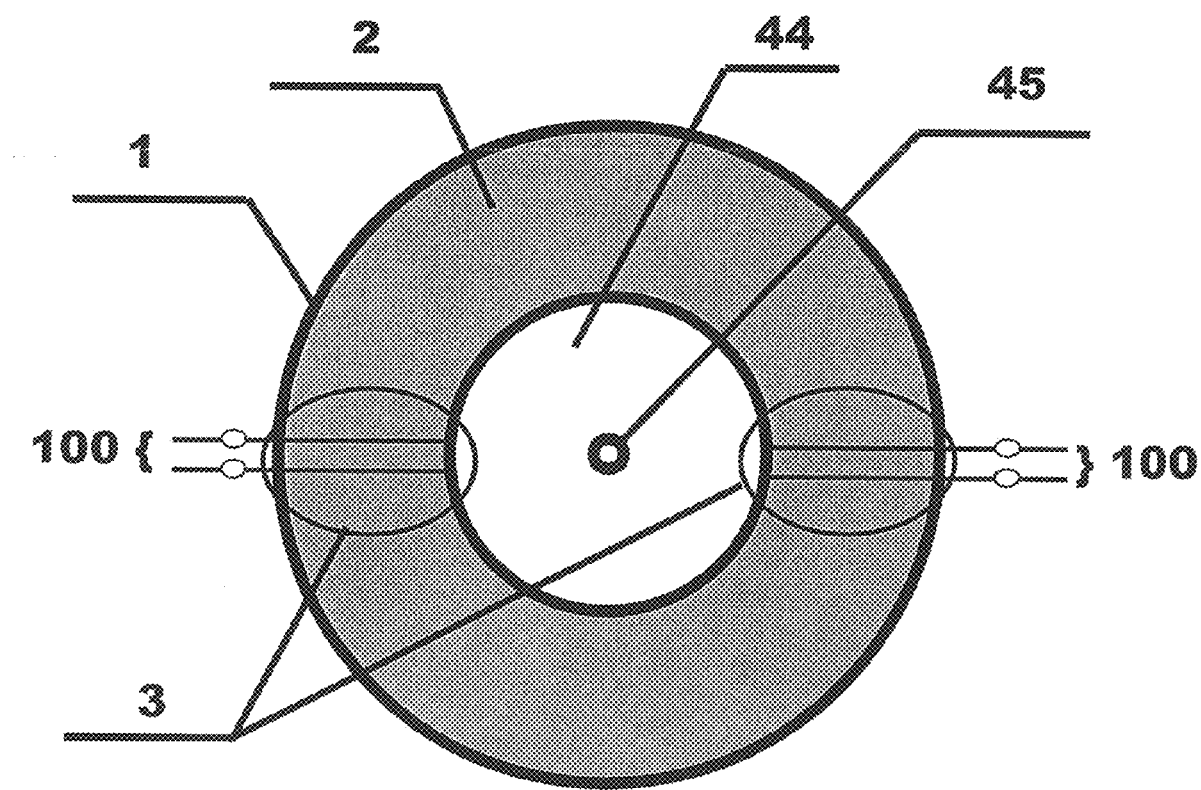
FIG. 21 is a schematic diagram of a toroidal channel accommodating a pair of installation modules disposed diametrically opposite to each other, each module comprising a sensing element having two conductive members.
Figure 22:
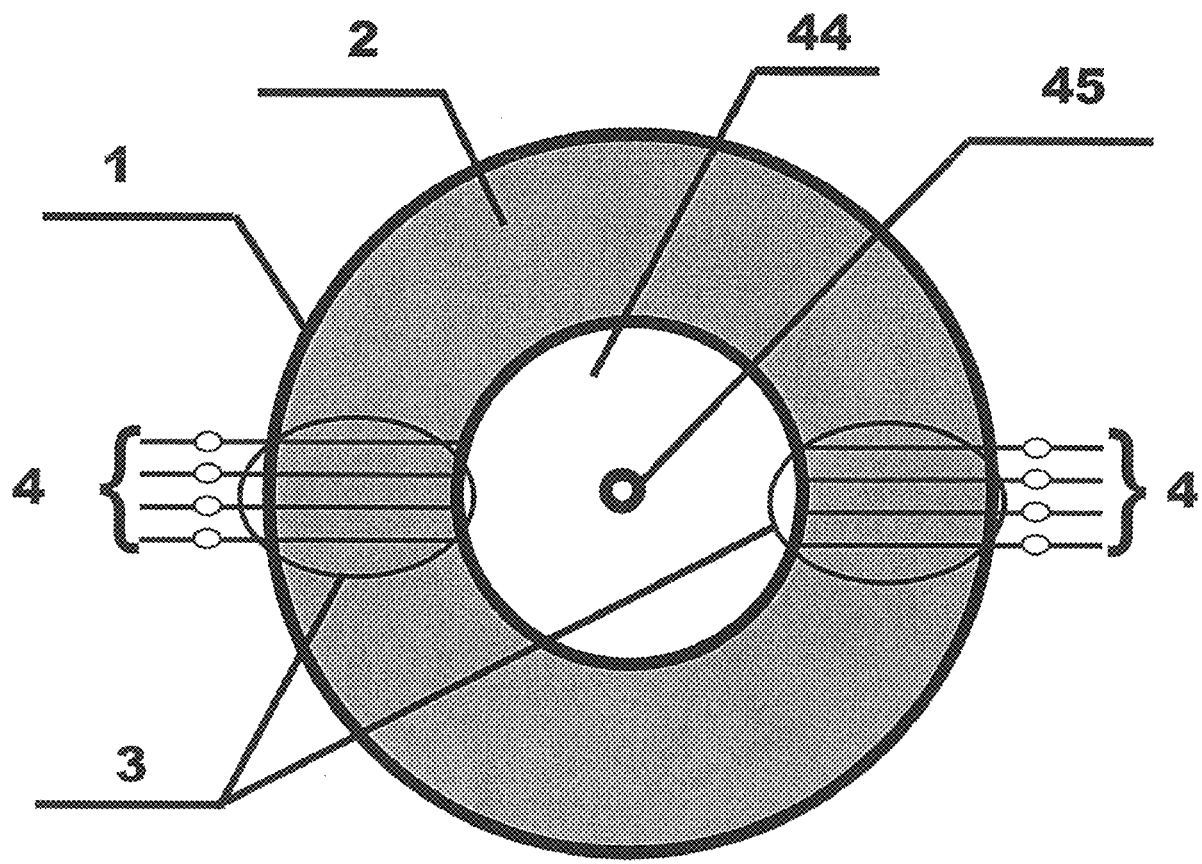
FIG. 22 is a schematic diagram of a toroidal channel with installation modules having sensing elements with two pairs of conductive members.
Figure 23:
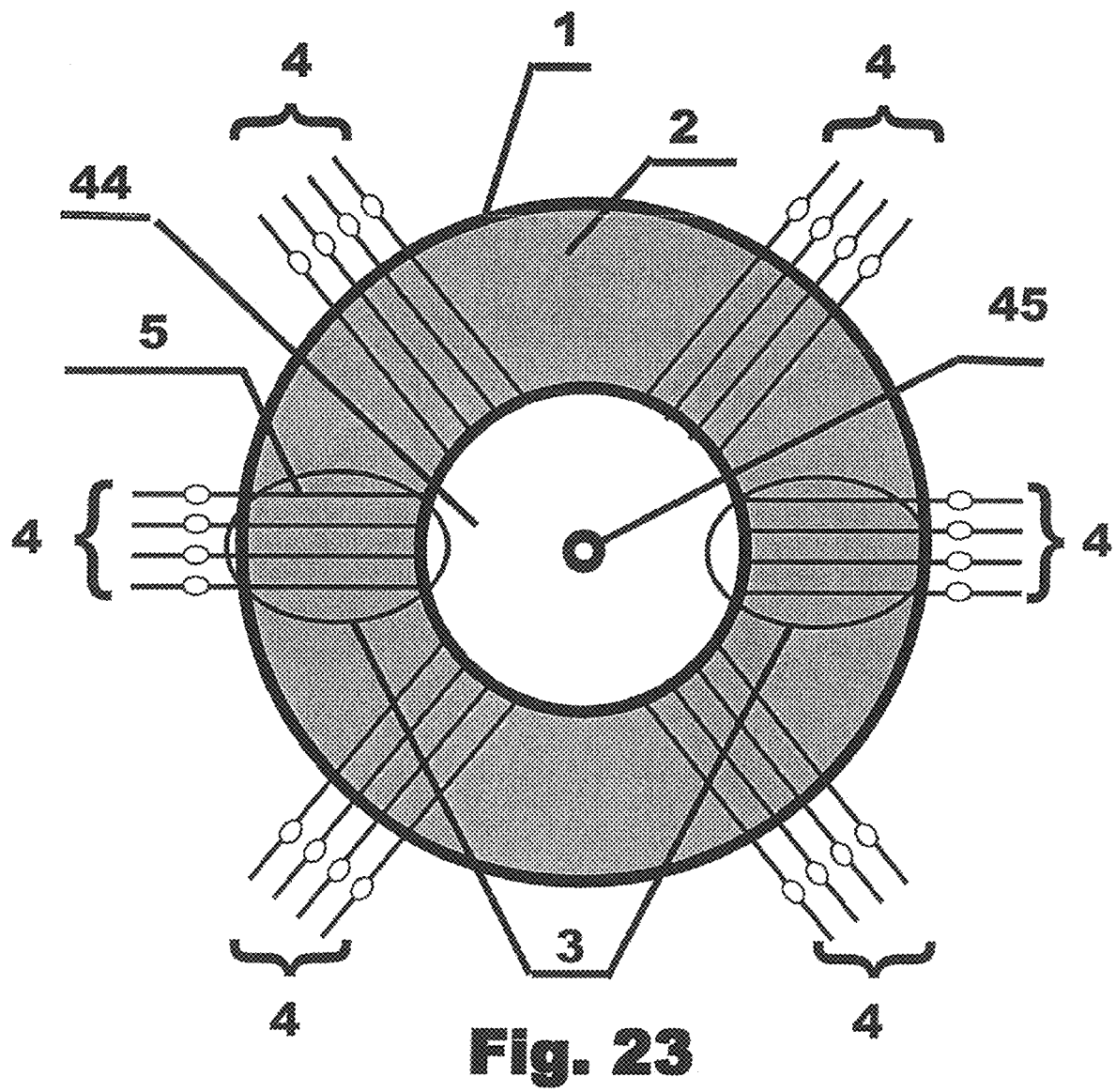
FIG. 23 is a schematic diagram of a toroidal channel with an even number of installation modules and the corresponding sensing elements.

The conductive member 5 can be arranged in the center of the installation module 3 (FIG. 1) at the same distance from each other so as to minimize the difference between the absolute values of the currents through each pair of conductive members 100, 200 under the quiescent state and to minimize the deviation of the amplitude-frequency characteristics of each pair of conductive members relative to each other. The conductive members 5 may be located at a fixed distance from the walls of the installation module 3 to avoid possible misalignment. When the conductive members are in the form of a mesh (see FIG. 9) the centers of the holes in the dielectric spacers are preferably opposite to centers of the cells in the mesh (i.e., spaces between wires). Preferably, the area of the mesh should overlap the area covered by the holes in the spacer with margins equal to the radius of the hole. To improve the linearity of the characteristics of the accelerometer, the toroidal channel 46 (FIG. 19) can be provided with two installation modules 3 (FIG. 21) located diametrically opposite to each other. Each of the installation modules 3 includes at least a pair of conductive members, but to increase the sensitivity of the accelerometer, the installation module 3 may include a second pair of conductive members as shown in FIG. 22. The number of installation modules 3 may be varied, although in some embodiments, it is preferable that an even number of installation modules 3 is used and that the installation modules are arranged symmetrically and evenly spaced about the sealed housing to improve the linearity of the accelerometer response. (e.g., see FIG. 23). In preferred embodiments, the installation modules are arranged symmetrically about a toroidal sealed housing to a spatial tolerance of 1° or less. In this case, by averaging the data obtained from each pair conductive members, the accuracy of measurements by means of the accelerometer can be increased considerably, because the measurement's error decreases with increasing the number of the installation modules n as $1/\sqrt{n}$. Generally, the number of installation modules and conductive members are chosen to achieve an optimum balance between high sensitivity and cut-off frequency.

Figure 24:
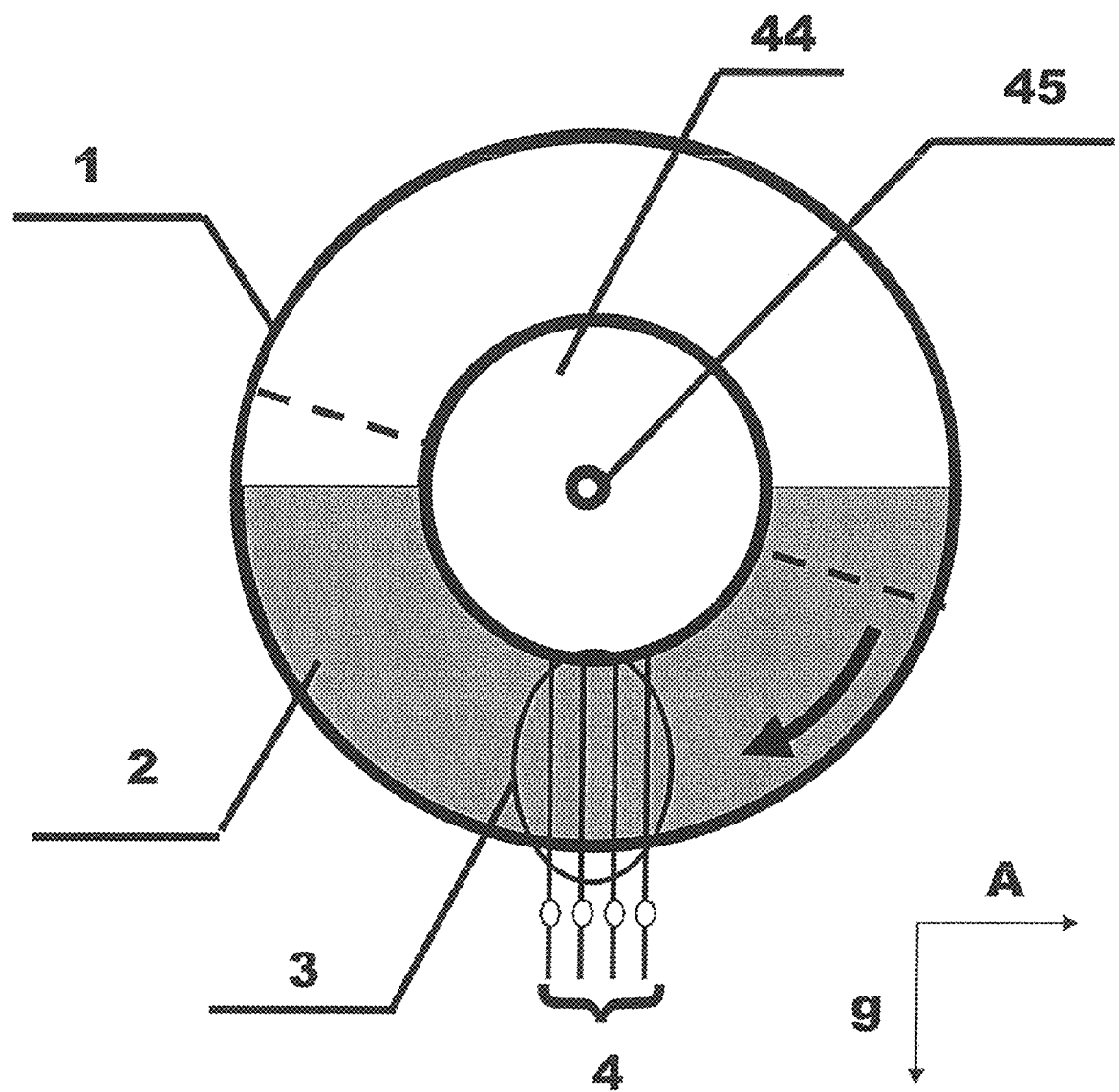
FIG. 24 shows a linear accelerometer according to the invention.

This invention also provides an accelerometer capable of measuring linear acceleration. In one embodiment, the linear accelerometer comprises a toroidal duct that is only partially filled with a liquid agent as described herein. As shown in FIG. 24, the toroidal duct for this type of linear accelerometer is oriented such that the plane of the toroid is parallel to the direction of gravity g, and at least one installation module 3 containing a sensing element is mounted such that it is submersed in the liquid agent in the toroidal duct. In a preferred embodiment, the toroidal channel is half-filled with the liquid agent 2. The axis of sensitivity A of this type of linear accelerometer lies in the plane defined by the toroid and is perpendicular to the direction of gravity. When the accelerometer experiences an acceleration having a component along the axis of sensitivity, the liquid agent flows in response to the acceleration, as indicated by the curved arrow in FIG. 24, leading to a change in the levels of liquid agent 2 in different parts of the toroid, as indicated by the dotted lines. This motion of the liquid agent is detected by the sensing element in a manner substantially similar to that described for the angular accelerometer described above. It will be recognized by one skilled in the art that non-toroidal shapes may be used for a linear accelerometer as well. As a non-limiting example, the internal and external generating shapes may be concentric rectangles or ovals.

The velocity and displacement can also be calculated mathematically by using the data gathered by the accelerometer, for example, by using computer integration methods well-known in the art. Therefore, the present invention can be used as an accelerometer, inclinometer, and a measuring device for velocity or displacement.

The external dimensions of the accelerometer can be made so small that the complete device can be placed in a standard modern 14-pin chip and it can have a configuration of outputs for installation on a standard card. The device according to the present invention can be made small enough for various applications including consumer electronics, entertainment devices, control and stabilization systems, sea, ground and air navigation networks, monitoring systems of an automobile and diagnostic stands, orthopedic devices, neuro-surgical instruments, and intrusion alarm systems. The accelerometer may be mounted horizontally, vertically, or inclined at some arbitrary angle.

With respect to sensitivity, frequency and dynamic range, the accelerometer exceeds by at least two orders of magnitude all prior art devices of the same dimensions. A simple design, low production cost, high operational reliability under different conditions make it extremely suitable for mass usage in quite different practical applications.

While the invention has been described in detail with reference to specific embodiments thereof, it will be apparent to one skilled in the art that various changes and modification can be made, and equivalents employed, without departing from the spirit and scope of the invention.

EXAMPLE 1

This example provides an angular accelerometer having a single installation module. The installation module was installed in a toroidal sealed housing having the following parameters:

1. diameter: 9 mm
 2. channel size: 2×2 mm,
 3. value of e: zero.

The sensing element contained 4 electrodes that were separated by 3 spacers. The electrodes were 30 μm thick metal plates that had an area of 2×2 mm and nine circular holes with a diameter of 200 μm. The spacers were 45 μm quartz plates with an area of 2.5×2.5 mm. The spacers also had nine circular holes with a diameter of 200 μm.

The transfer function of the accelerometer was measured using a rotational oscillating shake-table (IMV, Japan) for the 20-1000 Hz frequency range and a rotational oscillating calibrator provided for these tests by Center for Molecular Electronics (CME), Russia for the 0.08-40 Hz frequency range.

The IMV shake-table was driven at constant angular acceleration in the range 80-400 rad/$s^2$ in the frequency range 20-800 Hz. The tested sensor output signals were recorded and analyzed by PCS32i, Velleman digital PC oscilloscope/spectrum analyzer.

The maximum angular displacement of CME calibrator was 1°. This value confined the maximum acceleration and consequently the output signal of the sensors, especially at low frequencies. As a result, at low frequencies the output signal of the sensor could fall below the resolution threshold of the 12-bit digitizer that was used in the calibration process. Therefore, the calibrator was driven at maximum angular displacements achievable with this equipment. Additionally, the preamplifier with the factor of 100 for the frequency range 0.08-3 Hz was used. The calibration data were accumulated and processed using the special hardware and software integrated with calibrator setting.

Figure 25:
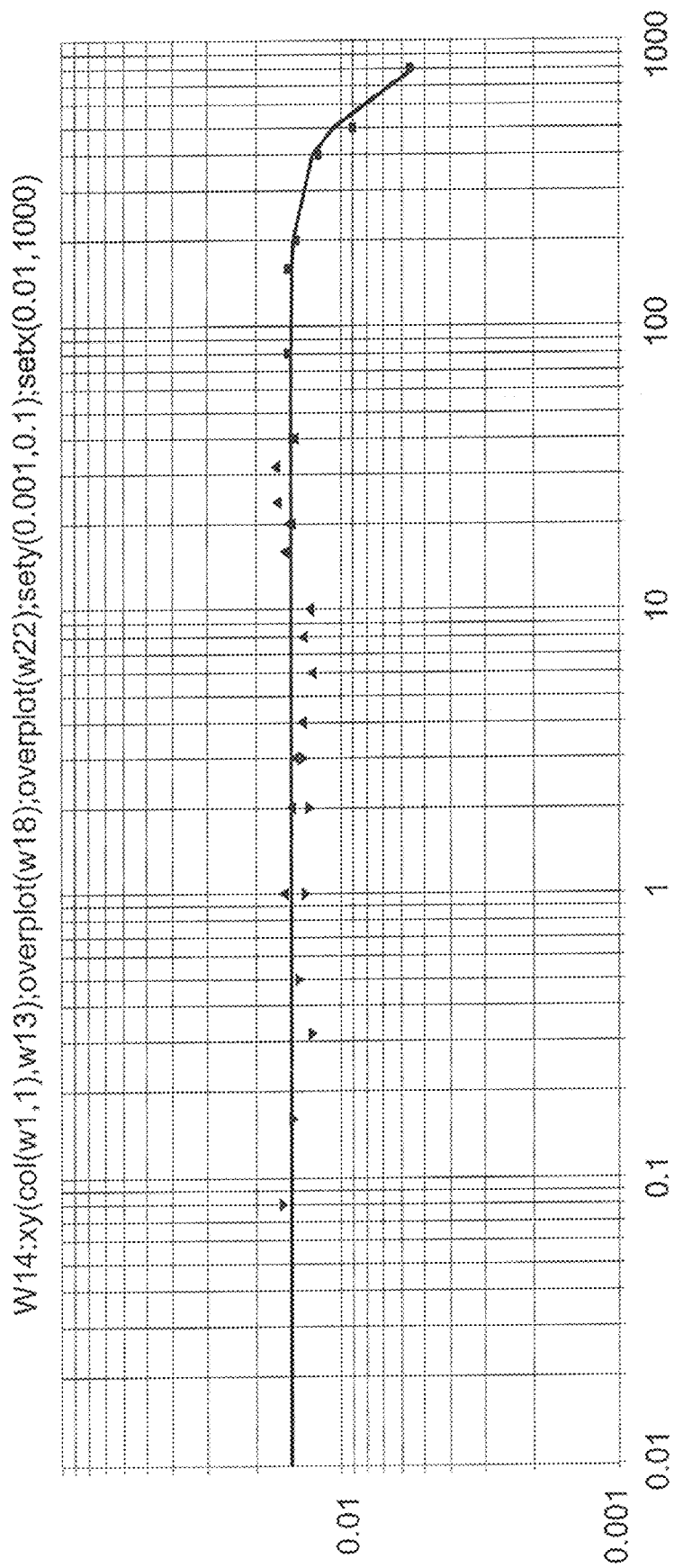
FIG. 25 shows calibration data for an angular accelerometer according to this invention.

The resultant curve, reduced to the original accelerometer gain is shown in FIG. 25.

The noise tests were performed at night. A 24-bit high-resolution digitizer was used to record data for 6 hours. Two identical accelerometers were positioned with sensitivity axes aligned in the same direction, and a correlation data processing technique was used to subtract the seismic signals and correlated part of digitizer self noise from the recorded data. The final noise was calculated by averaging over 16 samplings. In this case, the self-noise-floor of the sensors in the frequency range 0-500 Hz was found to be frequency-independent. After subtraction of the correlated part of the signals (to exclude the digitizer self-noise) the absolute value of the self-noise floor was found to be equal to −85 dB, relative to 1 rad/sec$^2$/√Hz. The integrated noise had the following value:

@1 Hz in the pass band 1 Hz–5×10$^{-5}$rad/sec$^2$.

The full range of the sensor was greater than or equal to 400 rad/sec$^2$. For this range the harmonic distortions and the gain dependence on the signal level were below the accuracy of the experimental equipment which was equal to 4%. Also, the dynamic range, defined as the ratio of the sensor full-range to the noise level has the following value:

138 dB relative to the noise in the passband 1 Hz @ 1 Hz.

EXAMPLE 2

One of the critically important uses of the claimed convective accelerometer is for improving homeland security. Towards this goal, the accelerometer may be used in many ways. Three non-limiting examples are described here: intruder detection, intruder identification, and remote lie-detection.

Figure 26:
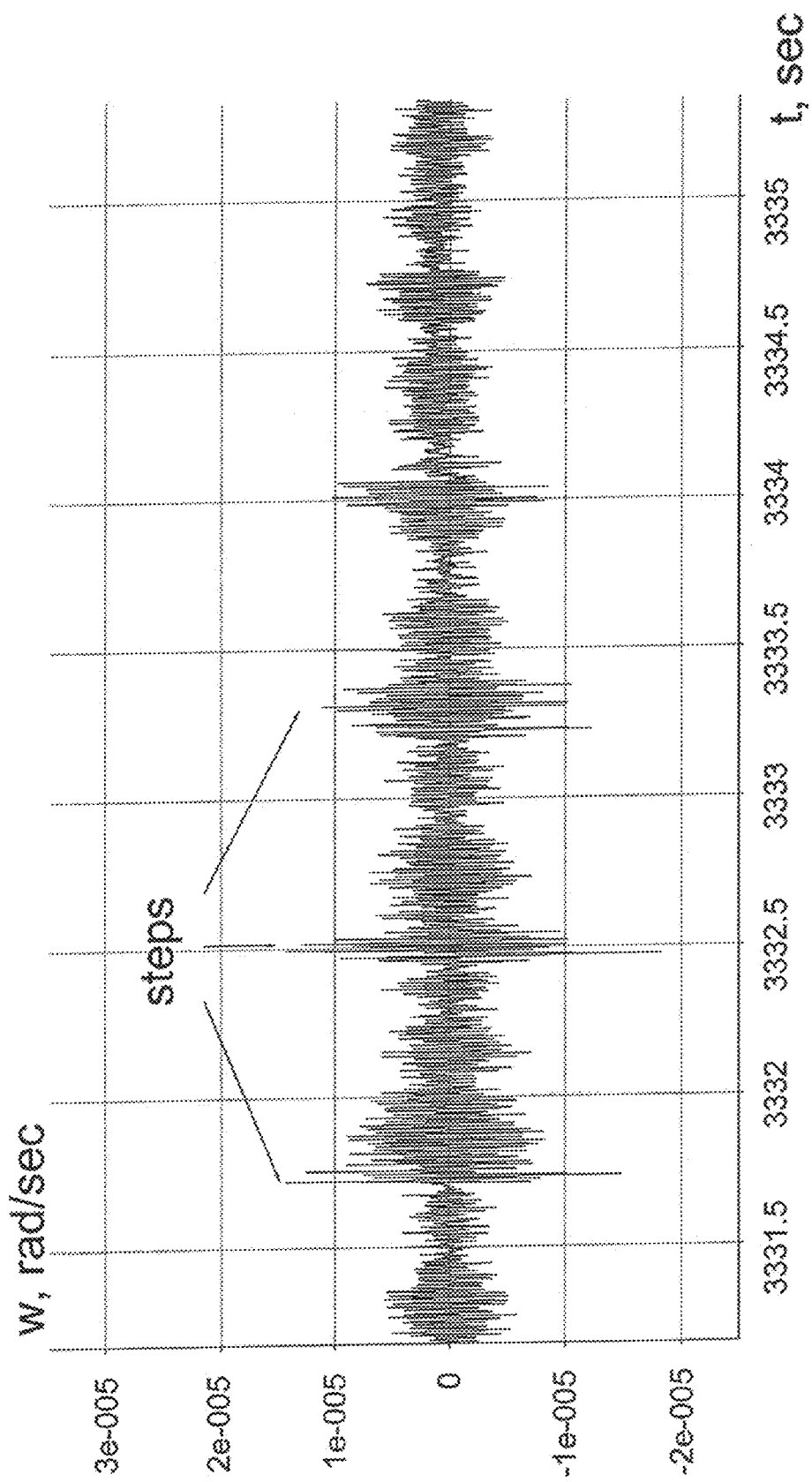
FIG. 26 shows the signature of a walking person in a through-wall detection experiment. The data have been recorded with a 24-bit digitizer at 320 sps (i.e., samplings per second.)
Figure 27:
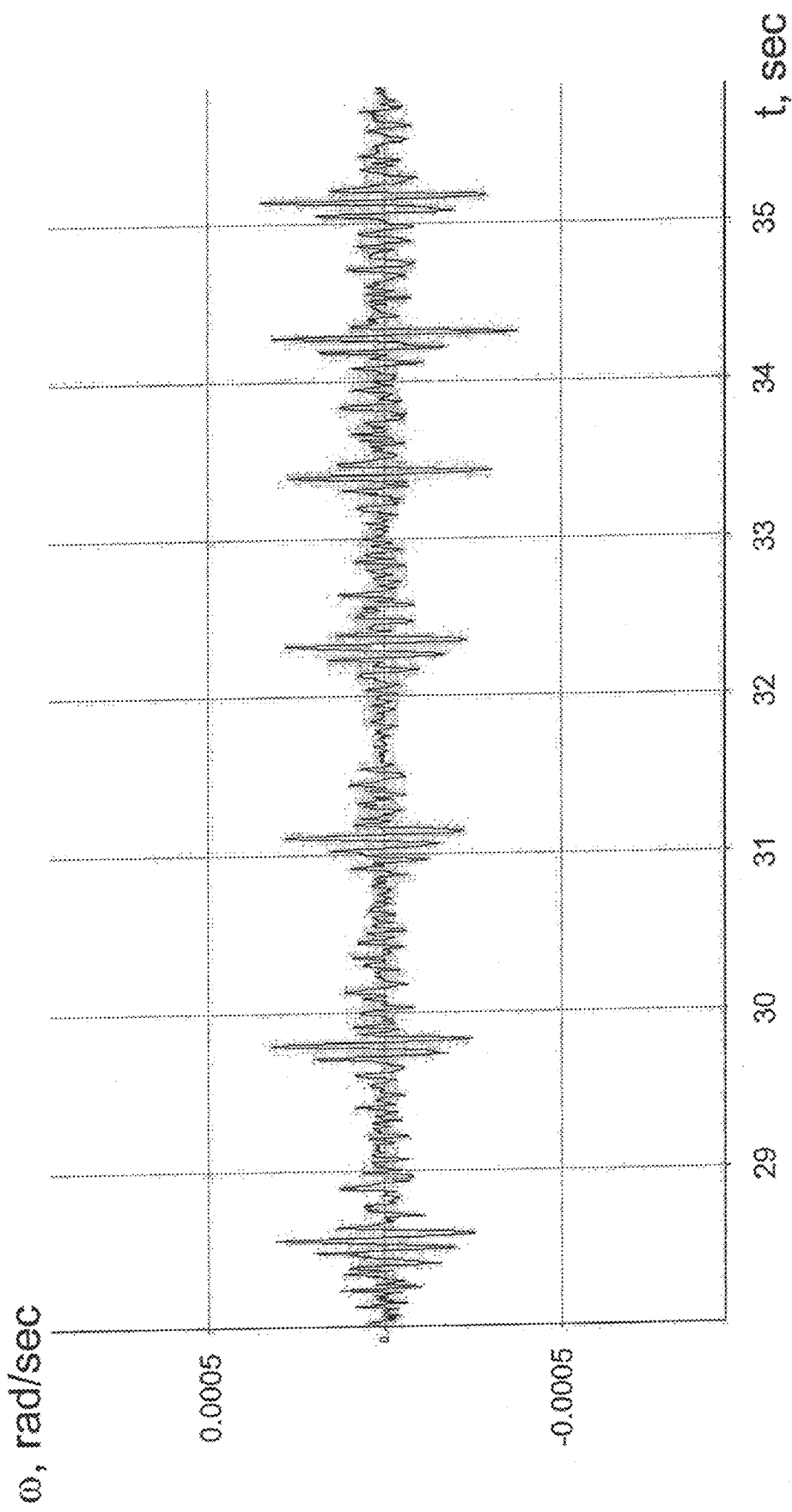
FIG. 27. shows heartbeat and respiration signals of a person recorded by the rotational accelerometer from about two meter distance (24-bit digitizer at 40 sps). The distance of such remote recording can be increased up to 6 meters by improving parameters of the rotational accelerometer.

With respect to intruder detection, the high sensitivity of the claimed convective accelerometer permits remote sensing of the presence of an intruder, even through the walls and floors of a building, by detecting the intruder's footsteps and/or physiological signals, such as heartbeat and respiration. Such detection is possible even in noisy urban settings, by using signal processing procedures well known in the art, (e.g. derivative spectra). FIG. 26 shows the signature of a person walking, as recorded by a rotational accelerometer mounted to the floor. Note that it is possible to distinguish separate steps (marked by the arrows) of the person, even though he was walking on another floor and at a distance of more than 10 meters from the accelerometer. FIG. 27. shows heartbeat and respiration signals of a person recorded by a rotational accelerometer positioned about two meters from the person and operated with a 24-hit digitizer at 40 sps (i.e. 40 samplings per second). The distance of such remote recording can be increased up to 6 meters by increasing the sensor dimensions and decreasing the hydrodynamic impedance of the accelerometer. Remote sensing using the convective accelerometer described herein has advantages over optical or infrared-based intruder detection methods, which often require a direct line-of-sight between the intruder and the detector.

Figure 28:
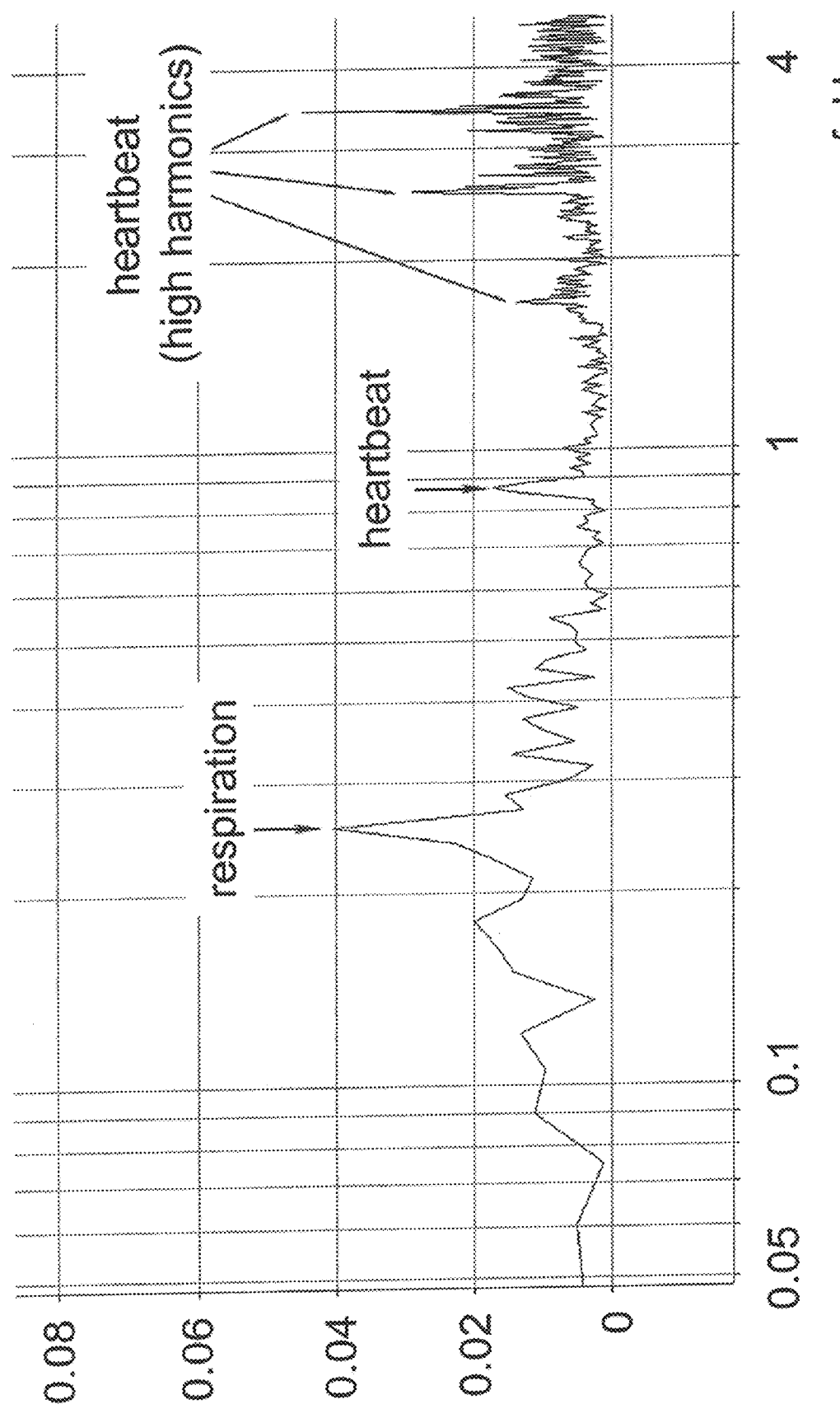
FIG. 28 shows the spectrum of the scan presented in FIG. 27.
Figure 29:
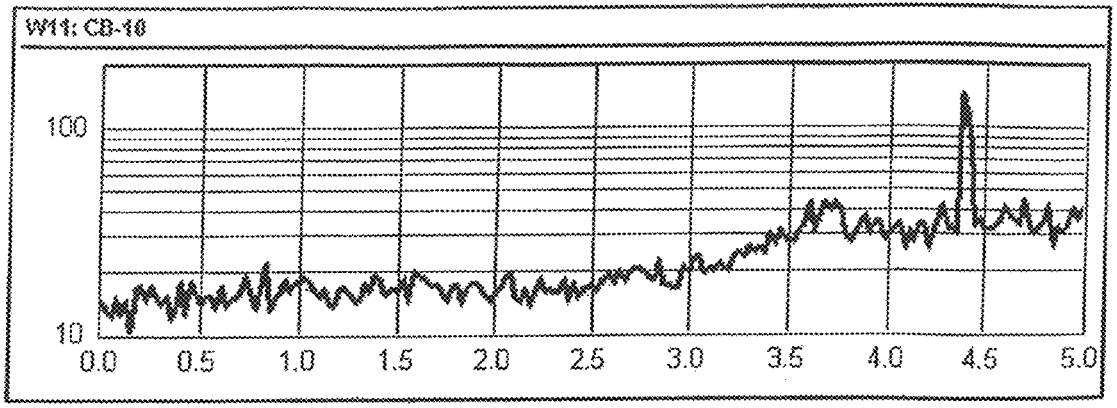
FIG. 29 shows the spectrum recorded by CB-10, a low cost geophone. Note that the geophone did not detect the low-frequency signals produced by the underground equipment.
Figure 30:
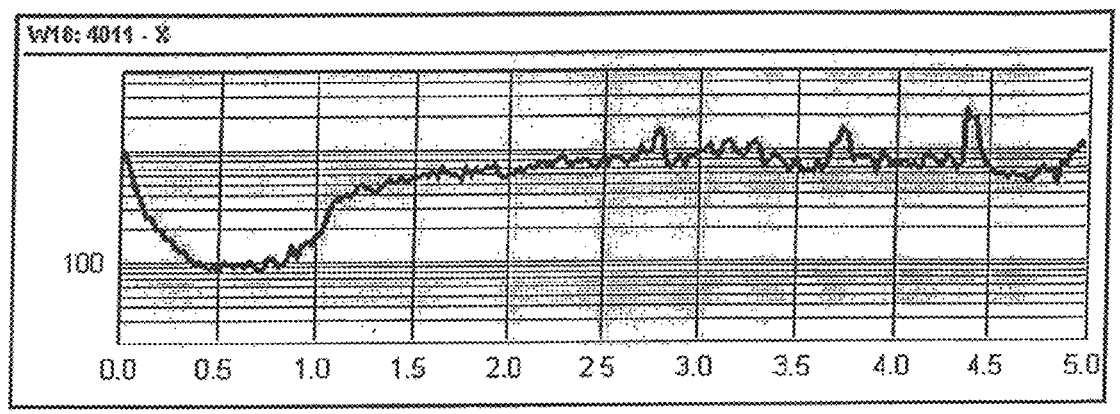
FIG. 30 shows the X-component spectrum recorded by a CME 4011 broadband seismometer of the translational motions of the drilling equipment
Figure 31:
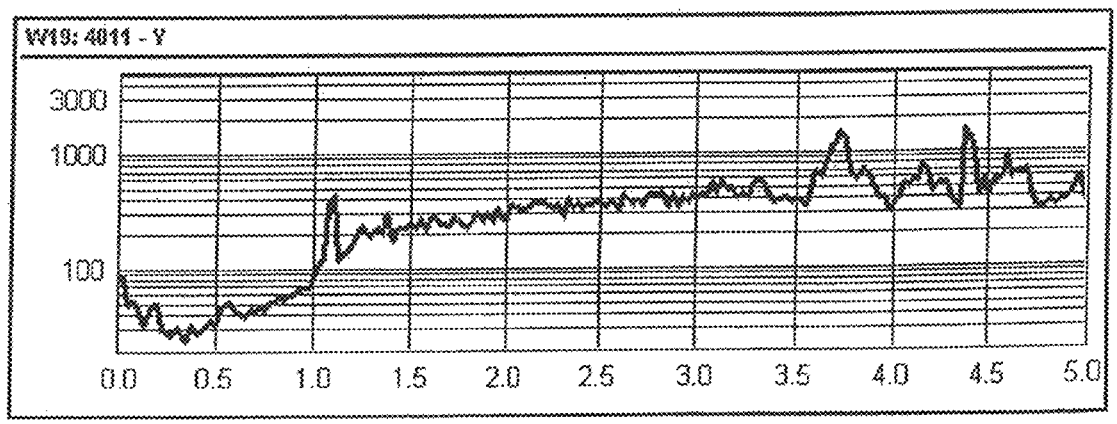
FIG. 31 shows the Y-component spectrum recorded by a CME 4011 broadband seismometer of the translational motions of the drilling equipment. The peak at 1.1 Hz corresponds to translational movement.
Figure 32:
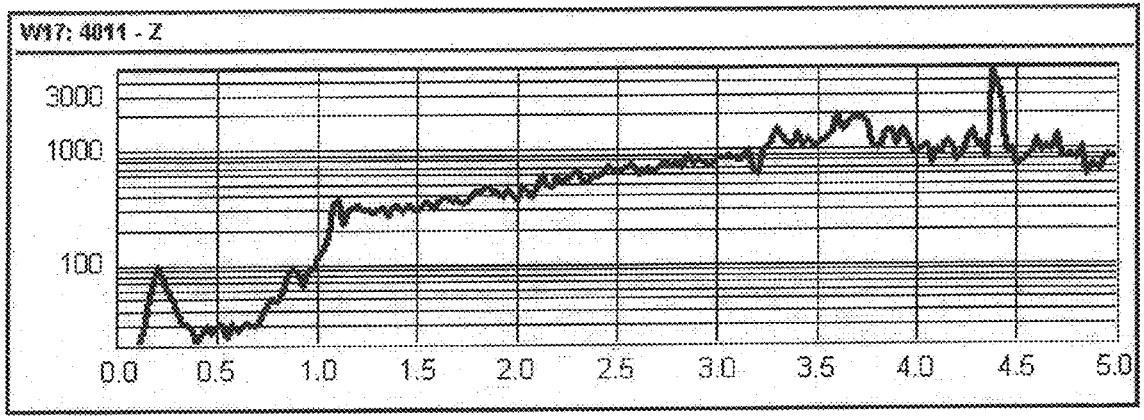
FIG. 32 shows the Z-component spectrum recorded by a CME 4011 broadband seismometer of the translational motions of the drilling equipment. The peak at 1.1 Hz corresponds to translational movement.

In addition to intruder detection, the claimed accelerometer may be used to identify a person on the basis of his physiological signals. For example, FIG. 28 illustrates a frequency spectrum (a "physiological seismogram") for heartbeat and respiration signals of a person obtained by using the rotational accelerometer according to this invention. As shown in the figure, distinct spectral features have been assigned to a person's respiration and heartbeat. Because people generally have different heart rates and breathing patterns, the ability to generate an personal profile based on such parameters is invaluable for identifying the person or distinguishing between two or more people.

This invention also contemplates the use of the accelerometer for remote lie-detection. As is known in the art, certain types of lie detectors operate by detecting changes in a person's heart rate caused by increased nervousness when a person lies. Because the convective accelerometer described herein is capable of detecting a heartbeat remotely, the convective accelerometer can be used as a remote lie-detector. For example, by mounting the convective accelerometer near a ticketing counter in a airport (e.g. under the floor), airline personnel can determine if a potential passenger becomes more nervous when asked about the contents of his luggage. Moreover, because the sensing is done remotely and hence surreptitiously, the potential passenger, if truly a terrorist, would not know to calm himself down to give a false reading, as he might if he were being strapped to a conventional polygraph. In this way, a more accurate assessment of the potential passenger's emotional state can be obtained.

EXAMPLE 3

This example shows that the convective accelerometers according to this invention may be adapted for use in seismic applications, such as seismic imaging or oil exploration. In particular, the rotational accelerometers as described herein can be adapted to measure the differential seismic field, or, more accurately, the curl of the displacement field directly. In contrast, prior measurements of the differential seismic field were indirect and required two spaced linear sensors and a series of calculations based on the outputs of the linear sensors.

By using a combination of linear and rotational accelerometers as described herein, it is possible to obtain substantially more information on subsurface geological conditions by 3D high-resolution seismic measurements. Unlike a conventional geophone, which is only capable of recording the first arrival of a seismo-acoustical signal, the combination of rotational and linear convective accelerometers separately capture the both the first arrivals of transverse waves by the rotational sensor, as well as that of longitudinal waves by the linear sensor. This is because the rotational sensor is insensitive to translational motions and the linear sensor is insensitive to rotational motions. Thus it becomes possible to measure $\Delta t = t_l - t_t$ with high accuracy, where $t_l$ and $t_t$ are the moments of the first arrivals of longitudinal and transverse waves respectively. The separation of the arrivals for longitudinal and transverse waves allows for determining not only Young's modulus, but also Poisson's ratio. Therefore, much higher accuracy in the identification of the properties of the medium along the waves' propagation becomes possible.

Another advantage of the proposed instrument is that the data from the combination of the rotational and linear accelerometers allow interpolation between specific installation points to determine the seismic field between these points, thus obtaining a high-resolution image of the seismic field for the same or smaller number of measurement points, compare with traditional approaches.

The following provides parameters of inexpensive high-resolution 3-D seismic instrumentation that have been built using the linear and rotational accelerometers according to this invention.

Frequency range: 1-1000 Hz;
Dynamic range: 126 dB;
Noise level: $5 \times 10^{-5}$ rad/sec$^2$/$\sqrt{\text{Hz}}$ for rotational channel and $10^{-6}$ m/sec$^2$/$\sqrt{\text{Hz}}$—for linear channel;
Power consumption: 5 mA from 12 Volts;
The temperature range: −40° C. to +55° C. (optionally up to +100° C.);
The overall combined sensor system dimensions:
diameter: 30 mm
length: 170 mm.

The high sensitivity and the small size of the sensors allow one to essentially simplify measurements and to reduce their expense, because it makes it possible to decrease the diameter of the boreholes, to increase the distance between them, and to reduce the power of the signal source. It substantially increases the amount of information obtainable and improves the resolution power of 3-D seismic measurements.

The convective accelerometers of this invention also opens new opportunity for drilling equipment control during the both oil or gas extraction and/or exploration. Generally, there are two approaches to control drilling equipment during oil or gas extraction: (1) sensors are placed on the drill. In this case there are several problems with proper operation of the sensors in an environment of high vibration and temperature, and with transmission of the data to the surface; or (2) sensors are placed on the earth's surface. In this case sensors should be extremely sensitive to detect the signals generated by the drilling equipment and also be capable of selecting useful signals in noisy environments.

This example focuses on the second approach, and in particular uses a seismic network equipped with low-noise, high-quality, broadband convective accelerometers that can measure drilling equipment parameters, similar to the measurement of earthquake parameters. Spectra obtained using conventional sensors are shown in FIGS. 29-32. In these studies, the sensors were installed on the earth's surface. Data are shown for a low-cost vertical geophone (model CB-10, frequency range 5-120 Hz: the Russian analog of the Guralp (UK) model CMG40T), and a linear three-component broadband seismometer (model CME4011, frequency range 0.033-20 Hz: the Russian analog of the Mark Products (USA) model L28). The sensors were placed at a distance of 600 meters from the drilling rig, while the operating drill was located at an approximate depth of 1 km under the earth's surface. The experiments were performed during the spring flood period and the drilling rig and sensors were located on two islands, separated by shallow water.

The following conclusions can be drawn from the data presented: (1) the low-cost vertical geophone (FIG. 29) did not detect the low-frequency signals produced by the underground equipment and consequently was useless for the purpose of the experiment; (2) the broadband seismometer recorded the peaks, corresponding to the translational motions of the drilling equipment (peaks at 1.1 Hz in FIGS. 31-32); and (3) none of the linear accelerometers used in the test detected the spectral components corresponding to the drill rotations.

Figure 33:
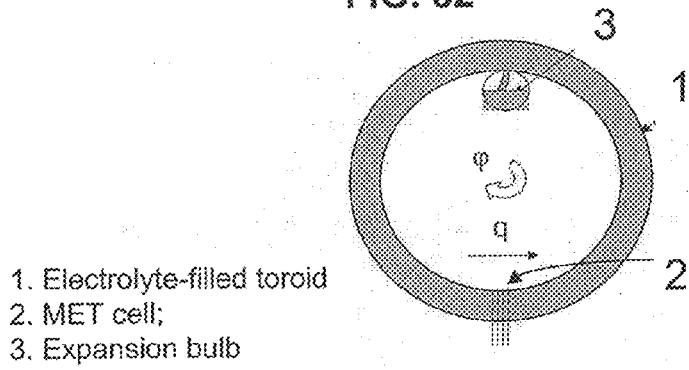
FIG. 33 is a schematic of a molecular-electronic rotational sensor.
Figure 34:
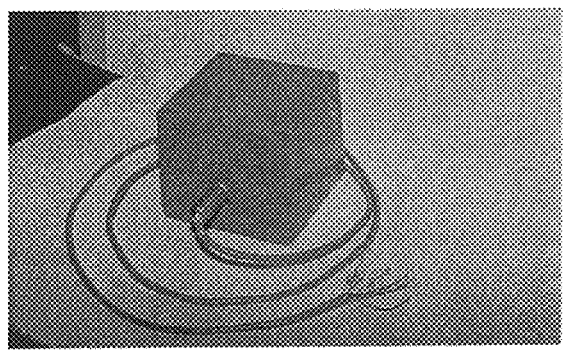
FIG. 34 shows a photo of a 3-component MET rotational sensor (dimensions: 100×100×100 mm$^3$).
Figure 35:
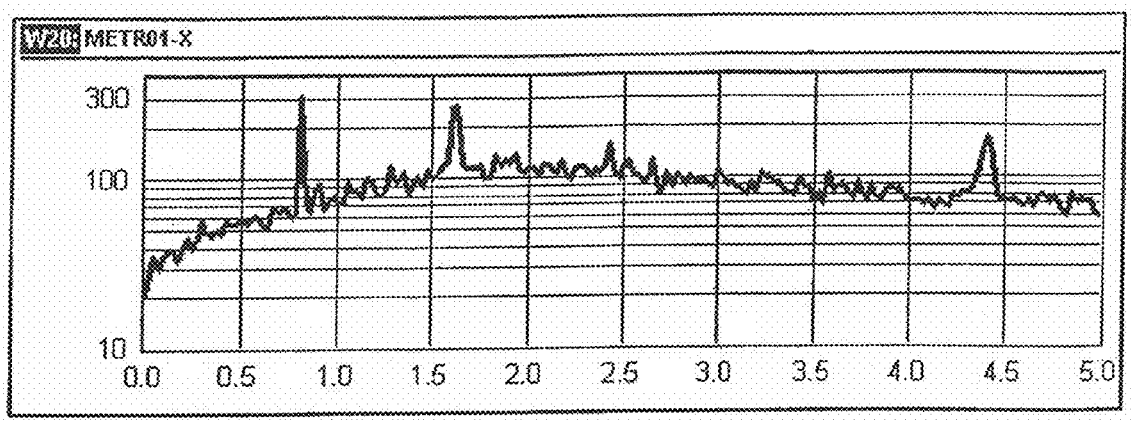
FIG. 35 shows an X-component spectrum recorded by a rotational accelerometer according to the invention.
Figure 36:
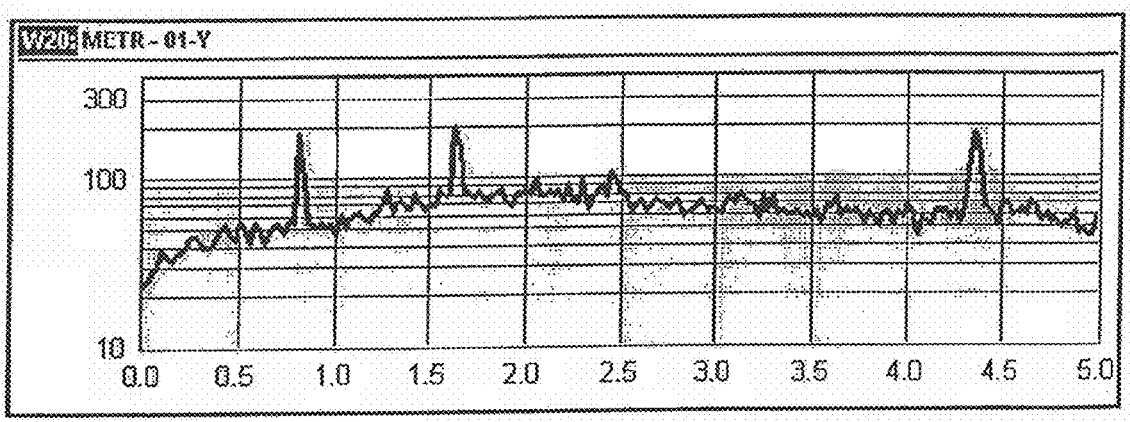
FIG. 36 shows an Y-component spectrum recorded by a rotational accelerometer according to the invention.
Figure 37:
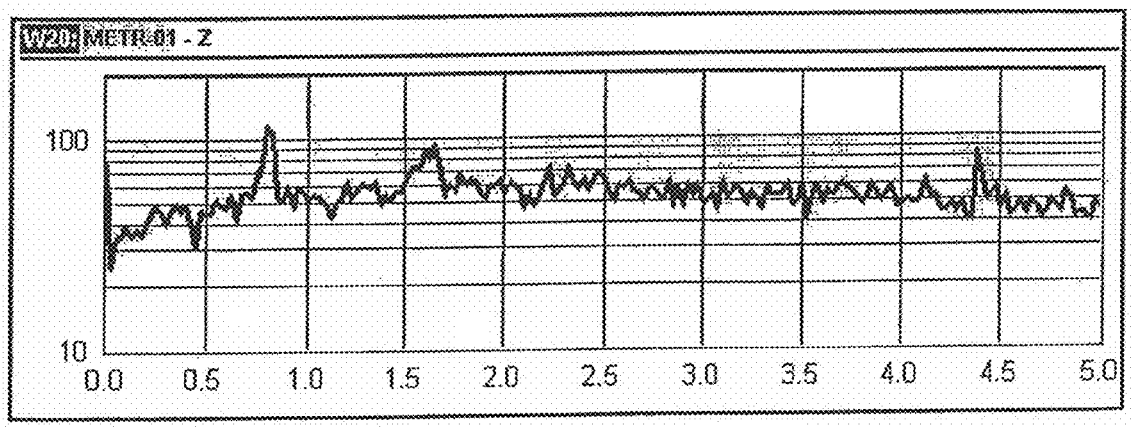
FIG. 37 shows an Z-component spectrum recorded by a rotational accelerometer according to the invention.

However, drill rotations were measured with a rotational convective accelerometer having a resolution of $5 \times 10^{-7}$ rad/sec and a frequency range of 0.05-100 Hz. Its operational principle is illustrated in FIG. 33. FIG. 34 presents the image of the three-component rotational convective accelerometer, and FIGS. 35-37 show the spectra recorded with the three-component rotational sensor. Only the rotational sensor detects the frequencies corresponding to the frequency of the drill rotation (0.8 Hz) and its second and third harmonics (1.6 and 2.4 Hz, correspondingly). These peaks disappeared when the drill was stopped and reappeared after renewal of operation. Such peaks could not observed in the spectra of the linear accelerometer, since they were masked by a background seismic noise related to water surface oscillations, which was especially significant on windy days. This noise, however, did not affect the rotational sensor, due to the spatial filtration capability of the rotational sensor.

The results of this experiment show that rotational sensors have great potential in the oil and gas industry in the following areas: (1) remote monitoring of the drill condition; (2) determining the drilling direction, made possible by using the relationship between the amplitude of the signals measured by all three components of the rotational sensor; (3) determining the position and velocity of the drill, by using the instant direction of the drill and the drilled-in distance. It should be emphasized that all these measurements and the data processing can be performed from the earth's surface to a distance of up to ~1 km from the drilling rig.

We claim:

1. A method of manufacturing a sensing element for a convective accelerometer, the method comprising
providing a plurality of conductive members;
providing a plurality of dielectric spacers;
arranging the conductive members and the dielectric spacers such that adjacent conductive members are separated by a dielectric spacer with no gaps therebetween;
creating a plurality of holes in the dielectric spacers and the conductive members;
wherein the holes in the dielectric spacers and the holes in the conductive members are coincident, and wherein the diameter of the holes in the dielectric spacer have a diameter between about one and about 300 microns.

2. The method according to claim 1, wherein the conductive members comprises metal plates.

3. The method according to claim 1, wherein the dielectric spacers comprises an oxide or a fluoride of the fourth group of the Periodic Table.

4. The method according to claim 3, wherein the dielectric spacer comprises quartz, forsterite or glass.

5. The method according to claim 4, wherein the dielectric spacer comprises glass.

6. The method according to claim 1, wherein the holes in the dielectric spacers are formed by laser drilling.

7. The method according to claim 1, wherein the holes in the conductive members are formed by laser drilling.

8. The method according to claim 1, wherein each of the dielectric spacers has a thickness in the range of about 0.5 to about 150 microns.

9. The method according to claim 8, wherein each of the dielectric spacers has a thickness in the range of about 1 to about 10 microns.

10. The method according to claim 1, wherein each of the conductive members has a thickness of about 30 microns.

* * * * *